(12) United States Patent
Rasmusson, Jr. et al.

(10) Patent No.: US 11,010,615 B2
(45) Date of Patent: May 18, 2021

(54) RENDERING A SITUATIONAL-AWARENESS VIEW IN AN AUTONOMOUS-VEHICLE ENVIRONMENT

(71) Applicant: Lyft, Inc., San Francisco, CA (US)

(72) Inventors: Robert Earl Rasmusson, Jr., San Francisco, CA (US); Taggart Matthiesen, Kentfield, CA (US); Craig Dehner, San Francisco, CA (US); Linda Dong, San Francisco, CA (US); Frank Taehyun Yoo, San Carlos, CA (US); Karina van Schaardenburg, San Francisco, CA (US); John Tighe, San Francisco, CA (US); Matt Vitelli, San Francisco, CA (US); Jisi Guo, San Francisco, CA (US); Eli Guerron, San Francisco, CA (US)

(73) Assignee: Lyft, Inc., San Francisco, CA (US)

(*) Notice: Subject to any disclaimer, the term of this patent is extended or adjusted under 35 U.S.C. 154(b) by 25 days.

(21) Appl. No.: 15/812,636

(22) Filed: Nov. 14, 2017

(65) Prior Publication Data

US 2018/0137373 A1 May 17, 2018

Related U.S. Application Data

(60) Provisional application No. 62/422,025, filed on Nov. 14, 2016.

(51) Int. Cl.
*G06K 9/00* (2006.01)
*G05D 1/02* (2020.01)
(Continued)

(52) U.S. Cl.
CPC ..... *G06K 9/00791* (2013.01); *B62D 15/0285* (2013.01); *G01C 21/365* (2013.01); *G01C 21/3638* (2013.01); *G05D 1/0044* (2013.01); *G05D 1/0088* (2013.01); *G05D 1/0212* (2013.01); *G05D 1/0246* (2013.01);
(Continued)

(58) Field of Classification Search
CPC ............ G06K 9/00791; G06K 9/6267; G01C 21/365; G01C 21/3638; B62D 15/0285; G05D 1/0274; G05D 1/0212; G05D 1/0044; G05D 1/0088; G05D 1/0246; G05D 2201/0212; G05D 2201/0213; G06T 7/20;
(Continued)

(56) References Cited

U.S. PATENT DOCUMENTS 9,779,314 B1 * 10/2017 Wendel ............. G06K 9/00825
2002/0076099 A1 * 6/2002 Sakamoto .......... G01C 21/3638
382/154
(Continued)

*Primary Examiner* — John W Lee
(74) *Attorney, Agent, or Firm* — Baker Botts L.L.P.

(57) ABSTRACT

In one embodiment, a method includes receiving autonomous-vehicle sensor data from a sensor array of an autonomous vehicle. The autonomous-vehicle sensor data indicates an object in an external environment of the autonomous vehicle. The method further includes determining a confidence score for a classification of the object. The method further includes determining an object graphic with a level of detail to visually represent the object. The level of detail of the object graphic is based on the confidence score. The method further includes providing for display a visual representation the object graphic.

20 Claims, 15 Drawing Sheets

(51) Int. Cl.
  G05D 1/00 (2006.01)
  G01C 21/36 (2006.01)
  G06T 7/20 (2017.01)
  G06K 9/62 (2006.01)
  B62D 15/02 (2006.01)

(52) U.S. Cl.
  CPC ......... *G05D 1/0274* (2013.01); *G06K 9/6267* (2013.01); *G06T 7/20* (2013.01); *B60W 2554/00* (2020.02); *G05D 2201/0212* (2013.01); *G05D 2201/0213* (2013.01); *G06T 2207/30252* (2013.01); *G06T 2207/30256* (2013.01); *G06T 2207/30261* (2013.01)

(58) Field of Classification Search
  CPC . G06T 2207/30252; G06T 2207/30256; G06T 2207/30261; B60W 2550/20
  See application file for complete search history.

(56) References Cited

U.S. PATENT DOCUMENTS

| | | | |
|---|---|---|---|
| 2004/0234136 A1* | 11/2004 | Zhu | G06T 7/20 382/224 |
| 2017/0123419 A1* | 5/2017 | Levinson | G05D 1/0088 |
| 2017/0206431 A1* | 7/2017 | Sun | G06F 16/5838 |
| 2018/0089505 A1* | 3/2018 | El-Khamy | G06T 7/73 |

\* cited by examiner

RENDERING A SITUATIONAL-AWARENESS VIEW IN AN AUTONOMOUS-VEHICLE ENVIRONMENT

PRIORITY

This application claims the benefit, under 35 U.S.C. § 119(e), of U.S. Provisional Patent Application No. 62/422,025, filed 14 Nov. 2016, which is hereby incorporated by reference in its entirety and for all purposes.

BACKGROUND

A dynamic transportation matching system may enable users (or requestors) to request rides from autonomous vehicles. A user may request a ride through the dynamic transportation matching system with a ride-service application on a mobile device of the user. The dynamic transportation matching system may, according to one or more privacy settings designated by a user, store user information (such as for example user preferences, pick-up or drop-off locations, payment information, or other suitable information) associated with the user.

Traditionally, transportation services have been provided by a human operating vehicle, such as taxis and ride sharing services. Improvements to computer technology have led to increasing efforts to automate these services using autonomous vehicles that do not require a human operator. However, riders are accustomed to traveling with a human driver that can see the road and avoid objects in the car's path. In an autonomous vehicle, a rider may not understand that the autonomous vehicle perceives the environment around it, including objects and obstacles in the road. This may cause the rider to become anxious or fearful during a ride in an autonomous vehicle.

DESCRIPTION OF EXAMPLE EMBODIMENTS

Figure 1:
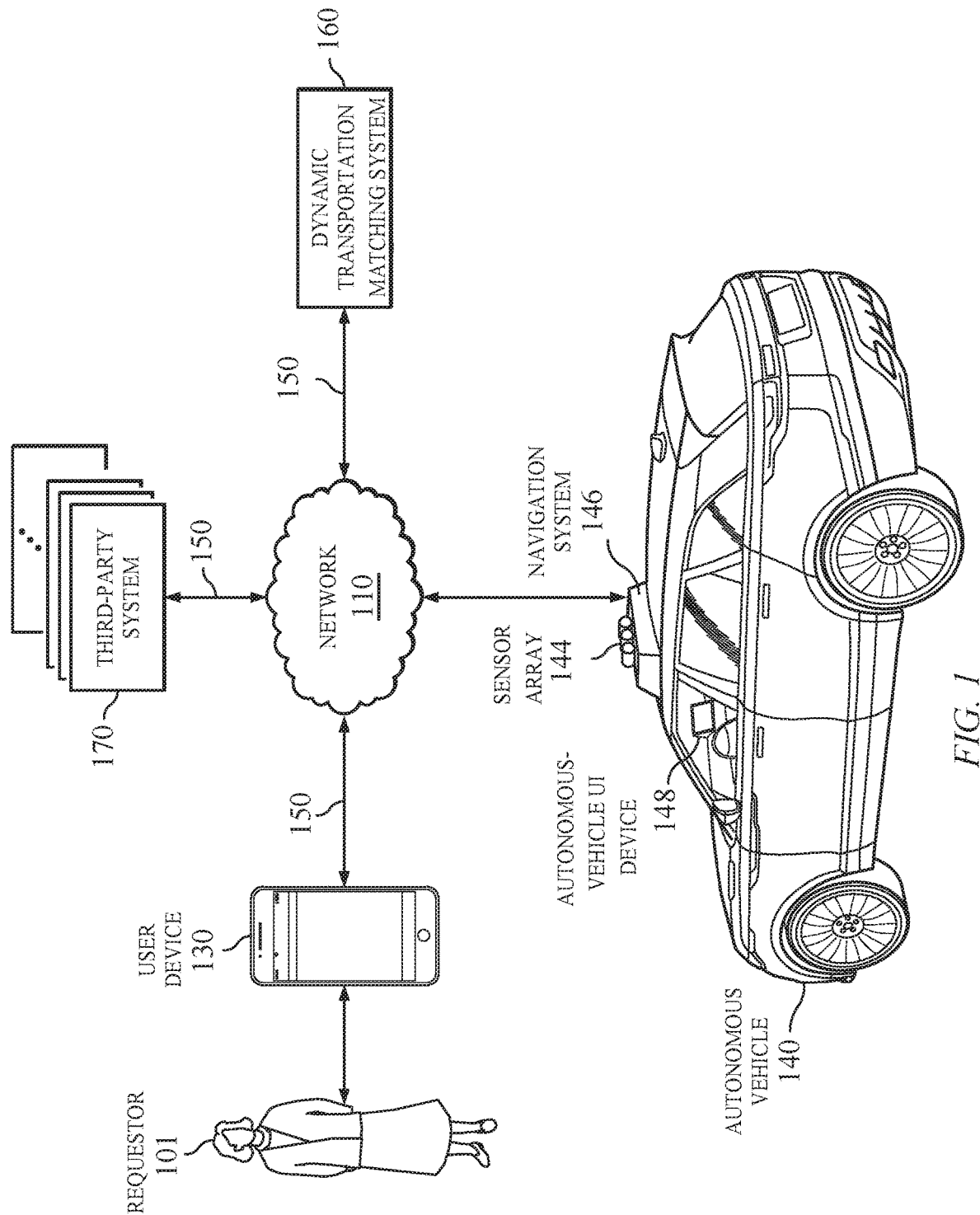
FIG. 1 illustrates an example network environment associated with a dynamic transportation matching system.

Riding in an autonomous vehicle can be disconcerting for some passengers. For example, a lack of understanding of what the autonomous vehicle perceives around it may cause a user to become anxious or scared. Moreover, the lack of control and general unawareness of how the autonomous vehicle is operating may inhibit users from using a dynamic transportation matching system that provides rides using autonomous vehicles. To reduce this fear or uneasiness and promote adoption rates, the dynamic transportation matching system may provide a situational-awareness view during a ride that is displayed on a computing device inside the autonomous vehicle. The situational-awareness view may be a display of the objects and roads that the autonomous vehicle perceives. The user may look at the situational-awareness view and feel comfortable that the autonomous vehicle is aware of all the objects in the external environment up to a threshold distance. This way, the user may not be as anxious about collisions or other accidents.

The situational-awareness view may be displayed on a computing device (e.g., tablet) in or integrated into the autonomous vehicle. Such a device may be referred to as an autonomous-vehicle UI device, where appropriate. In addition or as alternative, the situational-awareness view may be displayed on a mobile computing device of the user (e.g., a smartphone). The situational-awareness view may be generated based on autonomous-vehicle sensor data generated by sensors of the autonomous vehicle. In particular embodiments, the situational-awareness view may be generated based on map data and other third-party data (e.g., weather data, customer review data). The situational-awareness view may display a graphical representation of at least some of the external environment surrounding the autonomous vehicle. In particular embodiments, the situational-awareness view may include (1) one or more road graphics representing roads that the autonomous vehicle drives on, (2) one or more object graphics that represent objects (e.g., cars, people, buildings, traffic signs) in the external environment and within range of the sensors of the autonomous vehicle, and (3) one or more overlay graphics that provide additional information associated with the autonomous vehicle, the user, the ride the user is currently taking, or any other suitable information. Examples of overlay graphics include a trip progress bar that informs a user how far into the current ride they are, a route indicator, a speedometer, an autonomous drive indicator, or any other suitable graphic. Further, the situational-awareness view provides an intuitive and interactive interface for users to understand the environment surrounding the autonomous vehicle, the world as the autonomous-vehicle understands it, and to interface and interact with the autonomous vehicle to ensure a successful ride.

U.S. patent application Ser. No. 15/812,645, entitled "Identifying Objects for Display in a Situational-Awareness View of an Autonomous-Vehicle Environment" and filed 14 Nov. 2017 and U.S. patent application Ser. No. 15/812,749, entitled "Evaluating and Presenting Pick-Up and Drop-Off Locations in a situational Awareness View of an Autonomous Vehicle" and filed 14 Nov. 2017, are both related to subject matter similar to the subject matter disclosed herein. Both applications are hereby incorporated by reference in their entirety and for all purposes.

FIG. 1 illustrates an example network environment 100 associated with a dynamic transportation matching system. Network environment 100 includes a user 101, a user device 130 of a user, a dynamic transportation matching system 160, an autonomous vehicle 140, and one or more third-party system 170 connected to each other by a network 110. Although FIG. 1 illustrates a particular arrangement of user 101, user device 130, dynamic transportation matching system 160, autonomous vehicle 140, third-party system 170, and network 110, this disclosure contemplates any suitable arrangement of user 101, user device 130, dynamic transportation matching system 160, autonomous vehicle 140, third-party system 170, and network 110. As an example and not by way of limitation, two or more of user device 130, dynamic transportation matching system 160, autonomous vehicle 140, and third-party system 170 may be connected to each other directly, bypassing network 110. As another example, two or more of user device 130, dynamic transportation matching system 160, autonomous vehicle 140, and third-party system 170 may be physically or logically co-located with each other in whole or in part. Moreover, although FIG. 1 illustrates a particular number of users 101, user devices 130, dynamic transportation matching systems 160, autonomous vehicles 140, third-party systems 170, and networks 110, this disclosure contemplates any suitable number of users 101, user devices 130, dynamic transportation matching systems 160, autonomous vehicles 140, third-party systems 170, and networks 110. As an example and not by way of limitation, network environment 100 may include multiple users 101, user devices 130, dynamic transportation matching systems 160, autonomous-vehicles 140, third-party systems 170, and networks 110.

In particular embodiments, dynamic transportation matching system 160 may include one or more servers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, dynamic transportation matching system 160 may include one or more data stores. The data stores may be used to store various types of information, such as ride information, rider information, or any other suitable type of information. In particular embodiments, the information stored in the data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a user device 130, a dynamic transportation matching system 160, autonomous-vehicle system 140, or a third-party system 170 to manage, retrieve, modify, add, or delete, the information stored in data store 164.

In particular embodiments, user device 130 may be a mobile computing device such as a smartphone, tablet computer, or laptop computer. User device 130 may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or ride-service applications. With ride-service applications, users may connect to a dynamic transportation matching system to request rides to travel from one location to another.

In particular embodiments, autonomous vehicle 140 may be equipped with an array of sensors 144, a navigation system 146, and an autonomous-vehicle UI device 148. Autonomous vehicle 140 may be in the full control of dynamic transportation matching system 160, or it may be owned by a third party (e.g. a person or other entity). If owned by a third party, the third party may lend the autonomous vehicle for limited amounts of time to dynamic transportation matching system 160 for the purpose of providing rides to users. While the autonomous vehicle is being operated by dynamic transportation matching system 160, the autonomous vehicle may share data (e.g. sensor data, navigation data) with dynamic transportation matching system 160. Autonomous-vehicle sensor data may be captured by any suitable sensor arrangement, such as a Light Detection and Ranging (LiDAR) sensor array of multiple LiDAR transceivers that are configured to rotate 360° around the autonomous vehicle. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary.

In particular embodiments, the autonomous-vehicle sensor data may represent a three-dimensional schema of the external environment of the autonomous vehicle. As an example and not by way of limitation, the three-dimensional schema may represent the external environment including objects such as other cars and pedestrians up to a maximum range of the sensor arrangement (e.g., 100 meters). In particular embodiments, at least some of the autonomous-vehicle sensor data may be labeled (e.g., as labeled point sets) to include references to objects that are within a threshold distance from the autonomous vehicle. Although sensors 144 appear in a particular location on autonomous vehicle 140 in FIG. 1, sensors 144 may be located in any suitable location in or on autonomous vehicle 140. Example locations for sensors include the front and rear bumpers, the doors, the front windshield, on the side paneling, or any other suitable location. In particular embodiments, navigation system 146 may be any suitable autonomous navigation system, such as a navigation system based at least in part on a Global Positioning System (GPS) module, inertial measurement unit (IMU), LiDAR sensors, optical cameras, radio frequency (RF) transceivers, or any other suitable data gathering mechanism. Navigation system 146 may use map data and autonomous-vehicle sensor data to guide the autonomous vehicle to its destinations without colliding into other objects. Although navigation system 146 appears in a particular location on autonomous vehicle 140 in FIG. 1, navigation system 146 may be located in any suitable location in or on autonomous vehicle 140. Example locations for navigation system 146 include inside the cabin of autonomous vehicle 140, near the engine/battery, near the front seats, rear seats, or in any other suitable location. Although this disclosure describes a particular autonomous vehicle having a particular set of features (e.g. sensors, navigation system, dynamic transportation matching system computing device), this disclosure contemplates any suitable autonomous vehicle having any suitable set of features.

In particular embodiments, autonomous-vehicle UI device 148 may be a tablet or other suitable device installed by dynamic transportation matching system 160 to allow the user to interact with the autonomous vehicle 140, dynamic transportation matching system 160, other users 101, or a third-party 170. In particular embodiments, installation of autonomous-vehicle UI device 148 may be accomplished by placing the device 148 inside autonomous vehicle 140. Although a single autonomous-vehicle UI device 148 is illustrated in a particular location in autonomous vehicle 140 of FIG. 1, autonomous vehicle 140 may include several autonomous-vehicle UI devices 148 in several different locations within the vehicle. As an example and not by way of limitation, autonomous vehicle 140 may include four autonomous-vehicle UI devices 148 located in the following places: one in front of the front-left passenger seat (e.g. driver's seat in traditional U.S. automobiles), one in front of the front-right passenger seat, one in front of each of the rear-left and rear-right passenger seats. In particular embodiments, autonomous-vehicle UI device 148 may be detachable from any component of autonomous vehicle 140. This may allow users to handle autonomous-vehicle UI device 148 in a manner consistent with other tablet computing devices. As an example and not by way of limitation, a user may move autonomous-vehicle UI device 148 to any location in the cabin of autonomous vehicle 140, may hold device 148 in their lap, or handle device 148 in any other suitable manner.

In particular embodiments, autonomous-vehicle UI device 148 may be a computing device that has an application installed on it that communicates with dynamic transportation matching system 160. In particular embodiments, user device 130 may have the application installed on it that communicates with dynamic transportation matching system 160. In particular embodiments, autonomous-vehicle UI device 148 may include a display screen that is configured to display a situational-awareness view of a current environment of autonomous vehicle 140. In particular embodiments, the situational-awareness view may be presented by a projector that projects the situational-awareness view onto one or more surfaces in the autonomous vehicle 140. Surfaces may include a front windshield or side windows. The projection may operate similarly to a heads-up display, where the images are perceived as holograms. A situational-awareness view may be a representation of an environment of the autonomous vehicle that is updated in real time. In a situational-awareness view, graphical representations of objects that exist in the external environment of the autonomous vehicle may be displayed on the display screen of autonomous-vehicle UI device 148. As an example and not by way of limitation, autonomous vehicle 140 may be driving along a city street. Autonomous vehicle 140 may approach a traffic signal that changes from green, to yellow, to red. After the light changes to red, several pedestrians may cross the street in front of autonomous vehicle 140. Autonomous-vehicle UI device 148 may display a situational-awareness view that includes graphical representations of the traffic signal, the pedestrians, and any other objects (e.g. cars, street signs) within a threshold proximity of sensors 144 (e.g. 100 meters). The graphical representations of various data derived from various sources may be referred to herein as road graphics, object graphics, and overlay graphics.

Object graphics may be graphical representations of objects within a threshold distance of the autonomous vehicle 140. Road graphics may be graphical representations of the roads on which autonomous vehicle 140 navigates. Overlay graphics may be graphical or textual representations of information related to the user, a current ride, or autonomous vehicle 140 (e.g., a route indicator, destination address). These graphics may help a passenger understand the autonomous-vehicle sensor data being gathered by sensors 144. This may allow the passenger to see the vehicle-sensor data in a way that is understandable, intuitive, or user-friendly. To render the situational-awareness view, one or more computing devices associated with autonomous vehicle 140 may use autonomous-vehicle sensor data. If the user wishes to use their own user device 130 within the autonomous vehicle, the user device may display the situational-awareness view as it is received from another computing device associated with the autonomous vehicle 140 via a wired or wireless connection.

Figure 7:
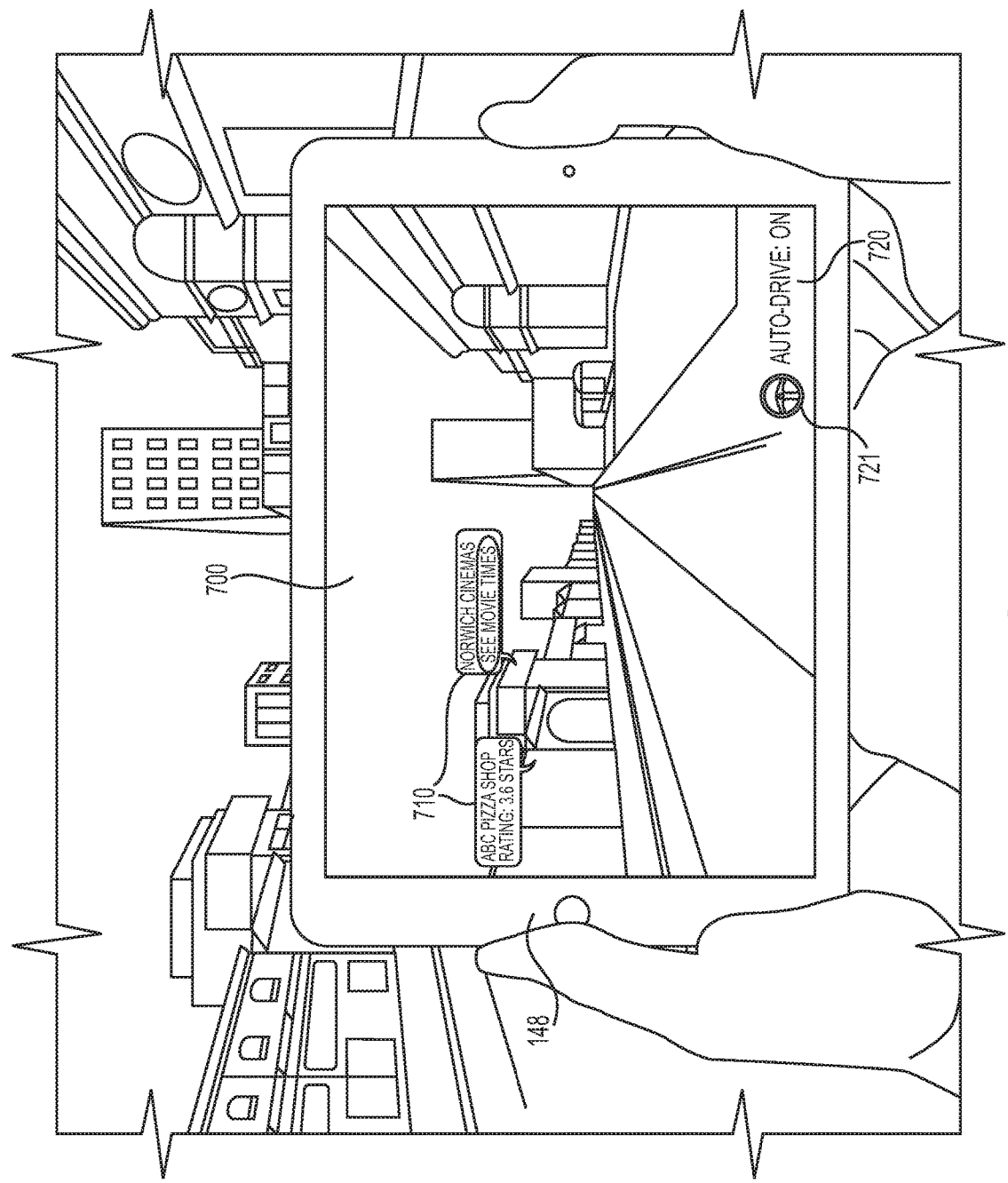
FIG. 7 illustrates another example UI on an example autonomous-vehicle UI device.

In particular embodiments, the computing device may incorporate other data in addition to the autonomous-vehicle sensor data to render the situational-awareness view. The other data may include map data, historical data, data accessed from third-parties, or any other suitable type of data. Historical data may include previous identifications and classifications of objects along a particular route. When providing rides to users 101, dynamic transportation matching system 160 may store the identified and classified objects along a route. As an example and not by way of limitation, the computing device may access information related to rides traveling from San Francisco International Airport (SFO) to Palo Alto, Calif. This information may include the objects that have been identified and classified in previous rides by autonomous vehicles from SFO to Palo Alto. The computing device may load at least some of the object graphics that correspond to previously identified and classified objects along the route from SFO to Palo Alto. As the autonomous vehicle 140 navigates along the route, the computing device may provide instructions to display the object graphics in the situational-awareness view. As an example and not by limitation, the route from SFO to Palo Alto may proceed along Highway 101. The computing device may access the GPS coordinates of the billboards along Highway 101. As the autonomous vehicle 140 passes GPS locations corresponding to the billboards, the computing device may send instructions to display object graphics representing the billboards. The same process may be performed for buildings. This may save significant computing resources because the computing device may not need to process and analyze as much received autonomous-vehicle sensor data in real time. Computing resources can be devoted to identifying and classifying moving objects on the road rather than stationary objects like billboards and buildings In particular embodiments, the other data may include data from third-party systems 170. Data obtained from third-party systems 170 may be displayed as an overlay graphic in the situational-awareness view. As an example and not by way of limitation, the computing devices may incorporate weather data from a third-party weather online resource to render the current weather in the situational-awareness view (e.g. if it is raining outside, autonomous-vehicle UI device 148 may display the representation of the environment as also raining). In this case, the rendering of the rain may be thought of as an overlay graphic. Overlay graphics are discussed in further detail herein. As another example and not by way of limitation, the computing devices may incorporate information related to nearby businesses and attractions from third-party applications such as YELP, GOOGLE MAPS, or other map-based databases. Continuing with this example, during a ride, autonomous vehicle 140 may drive on Webster Street in San Francisco, Calif. The situational-awareness view may display buildings as object graphics. These object graphics may correspond to actual buildings in the external environment of autonomous vehicle 140. One of the object graphics displayed in the situational-awareness view may be a building that represents the restaurant ABC Ramen. The situational-awareness view may include the name of the restaurant as an overlay graphic that overlays the object graphic representing the building where ABC Ramen is located. In particular embodiments, additional information related to the restaurant may be displayed. Alternatively, the additional information may be displayed if the user interacts with the object graphic (e.g., by tapping on it or by using voice commands). The additional information may include hours of operation, current wait time, customer reviews, a menu, a web resource (e.g., a link to the restaurant's website or to a third-party reservations application such as OPEN TABLE), customer reviews, a phone number, or any other suitable information. Example overlay graphics are illustrated in FIG. 7, as elements 710. Processing of autonomous-vehicle sensor data may comprise any suitable processing, including recognizing objects from autonomous-vehicle sensor data, rendering graphics using autonomous-vehicle sensor data for display on a display screen of autonomous-vehicle UI device 148, recognizing potential safety risks, or any other suitable analysis.

In particular embodiments, autonomous-vehicle UI device 148 may have an interactive touchscreen display and one or more other input/output (I/O) interfaces (e.g. a microphone). The display of autonomous-vehicle UI device 148 may be operable to receive rider input via a touchscreen in the form of taps on the touchscreen or via a microphone in the form of voice commands. Users of the ride service may interface with autonomous-vehicle 140 by interfacing with autonomous-vehicle UI device 148 to obtain information (e.g. ETA, ride length, current location, nearby attractions), input commands to the autonomous vehicle (e.g. set a new destination, end the current ride, pick up another passenger, view information related to nearby attractions, view payment information), or perform any other suitable interaction. In particular embodiments, instead of using ride-service computing system 148 to view and interact with autonomous vehicle 140 or dynamic transportation matching system 160, the user may use their own user device 130. In particular embodiments, the situational-awareness view may be displayed on user device 130 as it is received from a computing device associated with autonomous vehicle 140 via a wired or wireless transmission such as Bluetooth or Wi-Fi.

Dynamic transportation matching system 160 may be accessed by the other components of network environment 100 either directly or via network 110. In particular embodiments, dynamic transportation matching system 160 may include an authorization server (or other suitable component(s)) that allows users 101 to opt in to or opt out of having their actions logged by dynamic transportation matching system 160 or shared with other systems (e.g. third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of dynamic transportation matching system 160 through blocking, data hashing, anonymization, or other suitable techniques as appropriate. In particular embodiments, third-party system 170 may be a network-addressable computing system that can host GPS maps, customer reviews, weather information, or any other suitable type of information. Third-party system 170 may generate, store, receive, and send relevant data, such as, for example, map data, customer review data from a customer review website (e.g. YELP), weather data, or any other suitable type of data. Third-party system 170 may be accessed by the other components of network environment 100 either directly or via network 110. In particular embodiments, one or more users 101 may use one or more user devices 130 to access, send data to, and receive data from dynamic transportation matching system 160 or third-party system 170. User device 130 may access dynamic transportation matching system 160 or third-party system 170 directly, via network 110, or via a third-party system. As an example and not by way of limitation, user device 130 may access third-party system 170 via dynamic transportation matching system 160. User device 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect user device 130, dynamic transportation matching system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 2:
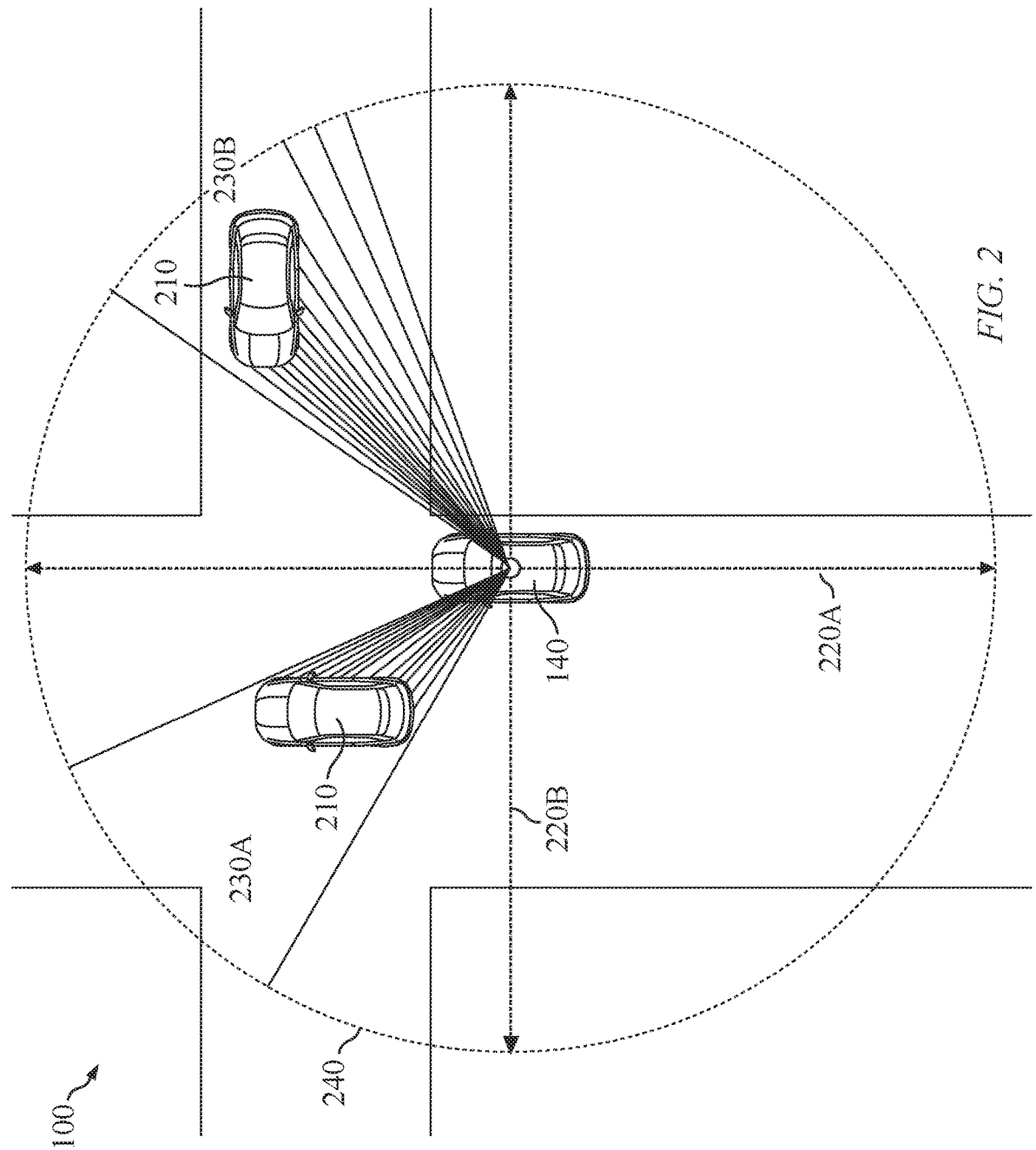
FIG. 2 illustrates an example driving environment of an example autonomous vehicle.

FIG. 2 illustrates an example driving environment of an example autonomous vehicle 140. In particular embodiments, a computing device associated with autonomous vehicle 140 or dynamic transportation matching system 160 may receive autonomous-vehicle sensor data that represents an external environment within a threshold distance of autonomous vehicle 140. In particular embodiments, the computing device may be autonomous-vehicle UI device 148, may be navigation system 146, or may be another suitable computing device or combination of computing devices associated with autonomous vehicle 140. The autonomous-vehicle sensor data may be collected via sensors arranged on the outside or the inside of autonomous vehicle 140. The autonomous-vehicle sensor data may enable autonomous vehicle 140 to identify objects in the surrounding external environment, such as vehicles 210. The autonomous-vehicle sensor data may further enable autonomous vehicle 140 to identify the road upon which it is driving, lanes in the road, or any other suitable object.

As an example and not by way of limitation, the sensors on autonomous vehicle 140 may be LiDAR sensors. LiDAR systems may measure how far away a physical surface in a 3D space is from the emitting device, as well as the direction to that surface, which allows for the creation of a full 3D model of the world around the sensor. The basic method of operation of a LiDAR system may be to transmit a beam of light, and then measure the returning signal when the light reflects off of an object. The time that the reflected signal takes to come back to the LiDAR module may provide a direct measurement of the distance to the object. Additional information about the object, like its velocity or material composition, may also be determined by measuring certain properties of the reflected signal, such as for example the induced Doppler shift. Finally, by steering or directing this transmitted light, many different points of an environment may be measured to create a full 3D model. The LiDAR sensors may transmit laser beams 230A and 230B in multiple directions around autonomous vehicle 140 within a distance 240, which may be the range of the sensors. As an example and not by way of limitation, the LiDAR sensors may transmit laser beams in any direction in a reference coordinate system having an x-direction 220A and a y-direction 220B. In particular embodiments, the reference coordinate system may also have a z-direction (not shown). Differences in laser return times and wavelengths may then be used to obtain coordinate information associated with the external environment of autonomous vehicle 140. In particular embodiments, the coordinate information may comprise distance information. The coordinate information may include a list of coordinate points (e.g. x, y, z coordinates) that represent locations where a LiDAR laser hit the surface of an object. In particular embodiments, based on the coordinate information, a three-dimensional representation may be generated for use by autonomous vehicle 140. In particular embodiments, the coordinate points may also comprise a time component t which may represent the time that a LiDAR beam was transmitted from the transceivers, hit an object, or was received by the transceivers. Autonomous vehicle 140 may use the time component of the coordinate points to determine a real-time three-dimensional representation of its external environment. In particular embodiments, autonomous vehicle 140 may combine the autonomous-vehicle sensor data with other types of data to detect roadways, buildings, traffic signs, and other objects. The other types of data may include data acquired from third parties. Examples of other types of data acquired from third parties include map data, traffic data, weather data, ratings data (e.g. from YELP or another third-party ratings entity) or any other suitable type of data.

In particular embodiments, the computing device associated with autonomous vehicle 140 may access map data. The map data may be associated with the external environment of autonomous vehicle 140. Map data may provide information about street names and street locations. The map data may be generated by a third-party (e.g. GOOGLE, DEEPMAP) and may be accessed by the computing device via an application program interface (API). Alternatively, the map data may be generated by dynamic transportation matching system 160. The map data may be stored by the computing device prior to a given ride. This may enable faster processing by the computing device because there may not be a need to access a third-party system 170 during a given ride. Autonomous vehicle 140 (e.g. via navigation system 146) may use the map data to determine one or more routes to navigate from an origin to a destination. In particular embodiments, the map data may comprise traffic data. The traffic data may indicate which routes have more or less traffic. Generally, more traffic may result in slower routes, so it may be desirable for autonomous vehicle 140 to take routes that have less traffic. In particular embodiments, the map data may be highly precise, offering data that is accurate to within 5-10 centimeters. This may mean that the map data may provide highly accurate road dimensions, so that if the autonomous-vehicle sensor data does not provide information for the location of the side of a road (e.g., where the curb or roadside is located), this information may be retrieved from the map data. The computing device may combine this data with GPS data of autonomous vehicle 140 to determine a location of the autonomous vehicle 140 with respect to the side of the road. The computing device may thus render a more accurately located road graphic that represents a curb or roadside.

In particular embodiments, the computing device associated with autonomous vehicle 140 (e.g., autonomous-vehicle UI device 148 or another suitable computing device) may determine a first view (e.g., situational-awareness view) based on the autonomous-vehicle sensor data. In particular embodiments, determining the situational awareness view may involve receiving a list of coordinate points as the autonomous-vehicle sensor data. These coordinate points may correspond to locations where a LiDAR laser hit the surface of an object in the external environment. Each point may have an x, y, and z component. The computing device may process the list of coordinate points and generate the situational-awareness view accordingly. As it is processing the list of coordinate points, the computing device may identify objects, classify each identified object, and assign each identified object a confidence score that represents the likelihood that the identified object has been correctly classified. As an example and not by way of limitation, the computing device may process the list of points and identify an object that is 50 meters away. Based on the locations of the coordinate points, the computing device may classify the object as a car.

In particular embodiments, the computing device may assign a confidence score to the classification. Continuing with the above example, the computing device may assign the classification of the car a confidence score of 0.65, based on the likelihood that the object is actually a car and not some other object such as a dumpster. The confidence score may be determined and assigned based on a variety of factors including the distance from autonomous vehicle 140 to the identified object, the noise in the data, how similar the identified object looks to a different class of object (e.g., a particular model of car may resemble a trash receptacle from far away). Noisy data may come from bad weather, a dirty sensor, etc., how much the identified object is moving in a non-linear path, or any other suitable source. In particular embodiments, the confidence score may be determined by comparing received sensor data to a pre-determined pattern that corresponds to the classification, and then determining the difference between the pre-determined pattern and the received sensor data. The received sensor data may include a subset of data points that correspond to an object. The subset of data points may be a labeled point set that was generated by another entity (e.g., sensor array 144), or may be a particular subset of data points in the received autonomous-vehicle sensor data. The subset of data points may be coordinate points with x, y, and z components. The subset may match a stored pattern for a particular object. Based on how closely the subset in the received data matches the stored pattern, the computing device may classify the object and assign it a confidence score using the methods described herein. As an example and not by way of limitation, the computing device may receive data that includes a subset of data points corresponding to an object. The subset may match a stored pattern for a cyclist. The computing device may normalize the two sets of data (e.g., the subset and the stored pattern) so that a difference may be calculated. For example, the bottom leftmost point on each of the subset and the stored pattern may be assigned the coordinate point (0, 0, 0). The computing device may then determine a difference between the stored pattern and the subset of data points using any suitable method, such as, for example determining the Euclidean distance between corresponding points in each set of data and averaging over all the points of data. Based on this difference, the computing device may assign the classification a confidence score. For example, if the classification is a cyclist and the average Euclidean distance is relatively small as compared with the distances between other classifications (e.g., car, pedestrian, dog), the computing device may assign the cyclist classification a relatively high confidence score.

In particular embodiments, the confidence score may be determined by a machine-learning model. The machine-learning model may predict the likelihood that the classification is correct. It may take as input the classification of the identified object along with the autonomous-vehicle sensor data, map data, third-party data (e.g., weather data), historical data, or any other suitable data. The machine-learning model may output the likelihood that the classification is correct expressed as a confidence score for the given input classification. The machine-learning model may be trained with training data. The training data may include a set of training examples. Each training example may include an input object and a desired output value. The input object may be a vector whose vector-elements correspond to the classification, various aspects of the autonomous-vehicle sensor data, historical data, and third-party data. The desired output value may be a "1" or a "0," depending on whether the classification is correct or not. Once the machine-learning model is trained, it may begin predicting the likelihood that a particular classification is correct given one or more other input data sets (e.g., autonomous-vehicle sensor data, map data, third-party data).

In particular embodiments, the computing device may receive additional data from sensor array 144 as autonomous vehicle 140 moves closer to the identified object. The computing device may process the additional data and adjust the confidence score based on the additional data. In particular embodiments, as the confidence score for a particular identified object increases, the corresponding object graphic may be rendered in greater detail. In particular embodiments, as the confidence score increases, the corresponding object graphic may be rendered with more opacity. As an example and not by way of limitation, if the confidence score is 0.50 that an identified object is a car, the corresponding object graphic may be rendered as 50% transparent. If the confidence score moves up to 75% that the identified object is a car, the corresponding object graphic may be rendered as 25% transparent. In particular embodiments, the level of opacity/transparency may be based on the distance the identified object is from autonomous vehicle 140. As an example and not by way of limitation, an identified object that is farther away may be rendered as an object graphic that is more transparent than an object graphic corresponding to a closer identified object.

In particular embodiments, the autonomous-vehicle sensor data may comprise one or more labeled point sets corresponding to objects in the external environment of autonomous vehicle 140. In this scenario, instead of receiving raw data points with x, y, and z components, the autonomous-vehicle sensor data may already be classified when it is received by the computing device. The data may come in "point sets," each point set corresponding to an identified object. Each point set may also be received with a confidence score. The rendering of the object graphic based on the classification and confidence score may function similar to the rendering of identified objects based on raw data, as discussed above.

Figure 3:
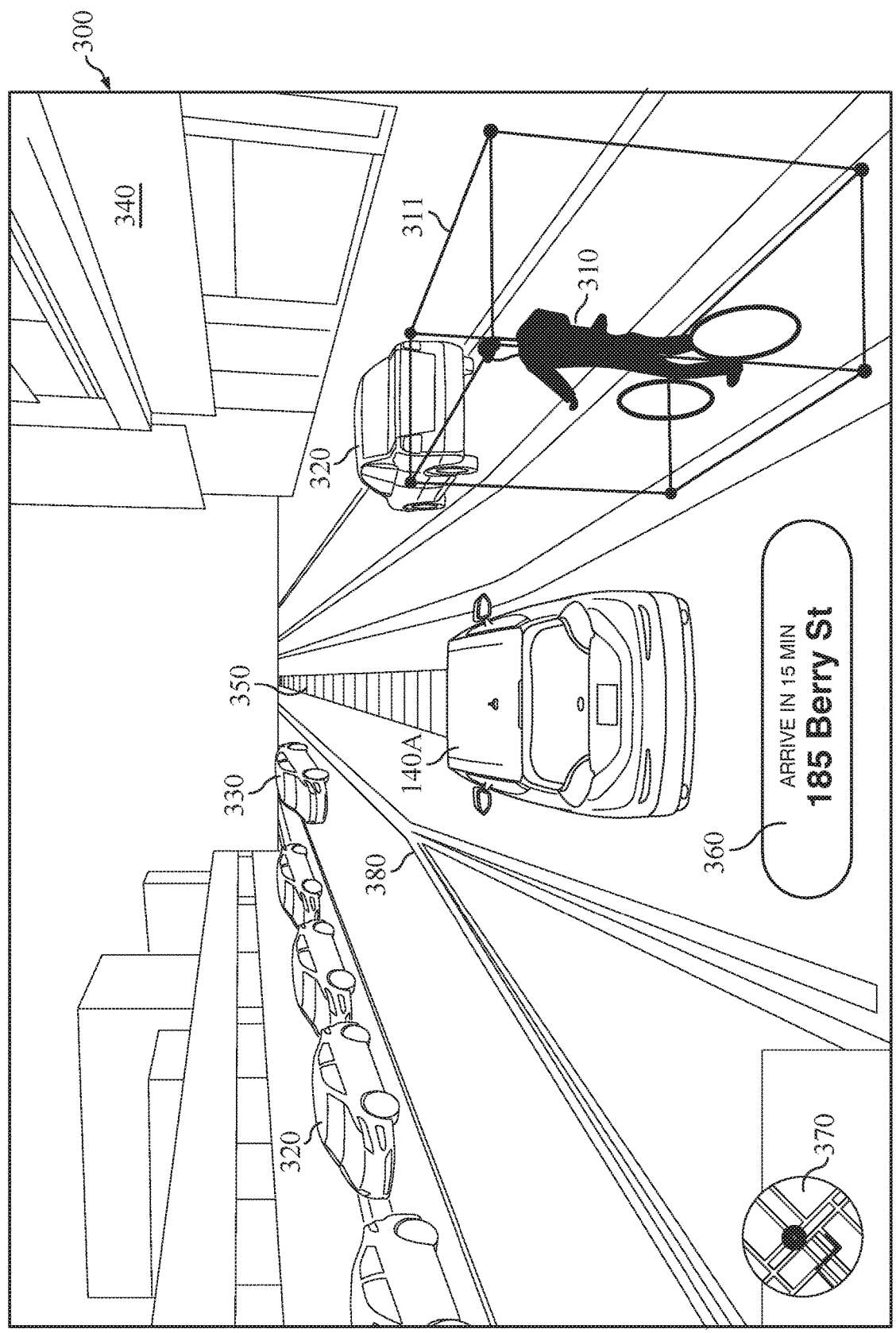
FIG. 3 illustrates an example user interface (UI) for displaying a real-time situational-awareness view associated with a ride in an autonomous vehicle associated with a dynamic transportation matching system.

FIG. 3 illustrates an example user interface (UI) 300 for displaying a real-time situational-awareness view associated with an autonomous ride. UI 300 may include a graphic representation of at least some of the autonomous-vehicle sensor data, map data, and third-party data (e.g., weather data). UI 300 may be displayed on the autonomous-vehicle UI device 148 or may be displayed on user device 130. UI 300 may display a situational-awareness view that includes one or more road graphics, one or more object graphics, and one or more overlay graphics. These graphics may help a passenger understand the autonomous-vehicle sensor data being gathered by sensors 144. This may allow the passenger to see the vehicle-sensor data in a way that is understandable, intuitive, or user-friendly. This may assuage the passenger's fears about riding in a car that does not have a human driver. These fears are a problem for many riders because their fears or anxiety deters them from taking rides in autonomous vehicles. One way to alleviate these fears is to provide the situational-awareness view, an example of which is shown in the graphical interface 300.

In particular embodiments, the object graphics may represent an object within a threshold distance of the autonomous vehicle as detected at least in part by one or more of the sensors on sensor array 144 of the autonomous vehicle. The threshold distance may be determined based on the range 240 of sensor array 144, or may be determined by dynamic transportation matching system 160. As an example and not by way of limitation, the range of sensor array 144 may be 100 meters. However, rendering an object graphic for every detected object within 100 meters of autonomous vehicle 140 may place a high burden on the processing power of the computing device and may also overwhelm the user. Therefore, it may be desirable to render only those object graphics that correspond to objects closer to autonomous vehicle 140 than the range of the sensor array 144. This distance may be 40 meters, 60 meters, 30 meters, or any other suitable distance. In particular embodiments, sensor array 144 may detect an object (e.g., a car) that is at the range of the sensors (e.g., 100 meters), and generate autonomous-vehicle sensor data for the computing device (e.g., autonomous-vehicle UI device 148 or other suitable computing device). Detecting an object prior to rendering its corresponding object graphic may be done so that the computing device may take advantage of lead time between the point in time when sensor array 144 detects the object and the point in time when the corresponding object graphic is rendered in the situational-awareness view. This lead time may be used to render the object graphic. This may save processing power and enable rendering of more detailed object graphics. Examples of object graphics include graphics associated with stationary objects 320 (e.g. parked cars, traffic signs or signals, mailboxes), graphics associated with moving objects 330, 310 (e.g. moving cars, bicyclists, pedestrians, runners), a graphic associated with autonomous vehicle 140 (e.g., as shown by element 140 in FIG. 3), or any other suitable graphic associated with objects that may come into the range of sensors 144 of autonomous vehicle 140. In particular embodiments, some objects may be partially rendered when displayed on the display screen. Partial rendering of an object may include rendering the object as semi-transparent, as discussed herein, or rendering the edges of the object that are closest to the autonomous vehicle in greater detail or opacity than the other edges.

In particular embodiments, the computing device may determine that an identified object is moving and may provide instructions to render an object graphic that has an indication that the corresponding object is moving. The process for such a determination may function as follows. The computing device may detect that an object is within a threshold distance from autonomous vehicle 140. The detection may be based on a first received set of autonomous-vehicle sensor data. The received set of data may include a subset of data points that correspond to the nearby object. Based on the subset of data points, the computing device may additionally determine the distance between the object and autonomous vehicle 140. In particular embodiments, the subset of data points may be a labeled point set that was generated by another entity (e.g., sensor array 144), or may be a particular subset of data points in received coordinate points with x, y, and z components. The subset may match a stored pattern for a particular object. Based on how closely the subset in the received data matches the stored pattern, the computing device may classify the object and assign it a confidence score using the methods described herein. As an example and not by way of limitation, the computing device may receive data that includes a subset of data points corresponding to an object. The subset may match a stored pattern for a cyclist. The computing device may classify the object as a cyclist and assign it a confidence score. After a brief time period (e.g., a fraction of a second), the computing device may receive a second set of autonomous-vehicle sensor data. The second data set may contain a subset whose pattern is substantially the same as the subset in the first received data set. Thus, the computing device may determine that the object is the same as that in the first data packet (e.g., a cyclist).

However, the distance between the cyclist and autonomous vehicle 140 may have changed, even after controlling for the motion of autonomous vehicle 140. This may be an indication that the identified object is moving. Because the cyclist is moving, an object graphic representing the cyclist (e.g., object graphic 310) may include a graphical indication that the cyclist is moving. This graphical indication may be any suitable indication, such as bounding box 311, rendering the object graphic in a different color, rendering a star, diamond, or other graphic over the object graphic, rendering the object graphic in thicker lines than stationary objects, or any other suitable indication. Each of these graphical indications may indicate to the user that the autonomous vehicle is aware of the object and its motion as wells as its surrounding space.

In particular embodiments, user interface 300 may be a situational-awareness view that includes one or more road graphics. A road graphic may represent a road on which autonomous vehicle 140 may drive. Examples of road graphics include graphics associated with any roads and intersections that are within range of the sensor array 144 of autonomous vehicle 140, street markings 380 (e.g., lane indicators), curbs, or any other suitable graphic associated with the roads on which autonomous vehicle 140 drives. A road graphic may be rendered in the situational awareness view farther away than the object graphics are rendered. This may be because a user may wish to see any given road graphic as far "into" the situational-awareness view as possible. This may result in the road graphic being displayed and then one or more object graphics being rendered and appearing on the road graphic as autonomous vehicle 140 navigates down a road. In particular embodiments, more than one road graphics may be included in the situational-awareness view. As an example and not by way of limitation, autonomous vehicle 140 may approach an intersection, and the situational-awareness view may include both a road object corresponding to the road that autonomous vehicle 140 is driving on as well as a road object corresponding to the road that autonomous vehicle 140 is approaching. As another example and not by way of limitation, the situational-awareness view may provide a top-down view instead of a behind-the-vehicle view that is illustrated in FIG. 3. The top-down view may be enabled when the user selects the map toggle interface element 370. The top-down view may allow the user to zoom out by pinching an appropriate area or tapping an appropriate icon to view several road graphics corresponding to the road that autonomous vehicle 140 is driving on as well as several nearby roads.

In particular embodiments, graphical interface 300 may display a situational-awareness view that includes one or more overlay graphics. An overlay graphic may provide particular information associated with one or more aspects of autonomous vehicle 140, user 101, the ride user 101 is currently taking, object graphics, road graphics, a current route of autonomous vehicle 140, or any other suitable information. Examples of overlay graphics include route indicator 350 (which may display the current route for the current ride), destination indicator interface element 360 (which may display information about the destination such as miles remaining until destination is reached, or estimated time of arrival), and map toggle interface element 370 (which may display an alternate situational-awareness view that is a top-down view instead of a behind-the-vehicle view as illustrated by FIG. 3). Other examples of overlay graphics that are not illustrated in FIG. 3 but are nevertheless contemplated by this disclosure include information related to detected objects corresponding to object graphics (e.g., distance from the detected object to autonomous vehicle 140, the speed of the detected object), a music playlist of user 101, information related to detected roads corresponding to road graphics (e.g., an indication of the amount of traffic congestion on that road, an indication of road construction on that road, the speed limit of that road), or any other suitable information.

As an example and not by way of limitation, the computing device may incorporate information related to nearby businesses and attractions from third-party applications such as YELP, GOOGLE MAPS, or other map-based databases. Continuing with this example, during a ride, autonomous vehicle 140 may drive on Webster Street in San Francisco, Calif. The situational-awareness view may display buildings as object graphics. These object graphics may correspond to actual buildings in the external environment of autonomous vehicle 140. One of the object graphics displayed in the situational-awareness view may be a building that represents the restaurant ABC Ramen. The situational-awareness view may include the name of the restaurant as an overlay graphic that overlays the object graphic representing the building where ABC Ramen is located. In other words, the name of the restaurant may cover part of the object graphic representing the building corresponding to ABC Ramen. In particular embodiments, additional information related to the restaurant may be displayed. In particular embodiments, additional information may be displayed if the user interacts with the object graphic (e.g., by tapping on it or by using voice commands). The additional information may include hours of operation, current wait time, customer reviews, a menu, a web resource (e.g., a link to the restaurant's website or to a third-party reservations application such as OPEN TABLE), a phone number, or any other suitable information. Although this disclosure describes rendering overlay graphics in a particular manner, this disclosure contemplates rendering overlay graphics in any suitable manner.

In particular embodiments, the computing device may determine route indicator 350 based on map data, sensor data, and route-guidance data. The autonomous-vehicle sensor data may only indicate projected points (called waypoints) that are 60 meters to 100 meters ahead of autonomous vehicle 140. Based on a curve associated with the upcoming waypoints, the computing device may need to infer the route that autonomous vehicle 140 will take and provide instructions to render route indicator 350 that is based on the inferred route. As an example and not by way of limitation, the upcoming waypoints may show that autonomous vehicle 140 may curve to the left. The computing device may need to determine whether this leftward curve is a left-hand turn on a particular road, or if the road autonomous vehicle 140 is currently driving on merely curves to the left. To make this determination, the computing device may determine the angle of the curve, analyze map data and autonomous-vehicle sensor data. If the map data shows the road curving but no other roads intersecting with the road autonomous vehicle 140 is driving on, the computing device may infer that autonomous vehicle 140 may continue to drive on the same road as the road curves to the left. On the other hand, if the waypoints show a 90° curve to the left, the computing device may infer that autonomous vehicle 140 is turning left on a particular street. The computing device may access a list of potential street names from a third-party system and infer the street name that autonomous vehicle 140 may turn on. This determination may additionally be made on the upcoming waypoints and the autonomous-vehicle sensor data in addition to the map data.

In particular embodiments, at least some of the object graphics, the road graphics, and the overlay graphics may be interactive. As an example and not by way of limitation, if the user taps on the graphical rendering of autonomous vehicle 140, information related to autonomous vehicle 140 may be displayed, such as the make, model, year, the battery or fuel level, the number of miles driven that day, week, month, or during the lifetime of autonomous vehicle 140, or any other suitable information. As another example and not by way of limitation, if the user taps on map toggle interface element 370, a larger-sized map may be displayed on the display screen. The user may then be able to interact with the map in any suitable manner. As another example and not by way of limitation, if the user taps on destination indicator interface element 360, information about the destination may be displayed, such as miles remaining until destination is reached, or estimated time of arrival. The user may be able to set a new destination, see information related to the destination, or view any other suitable information.

In particular embodiments, every element in graphical interface 300 may be interactive. As an example and not by way of limitation, if the user taps on a rendering of a building 340, data related to that particular building may be displayed, as discussed above. If the building is a restaurant, the computing device may access third-party data related to the restaurant and display the information, as discussed above. As another example and not by way of limitation, if the user taps on a rendering of a pedestrian, the graphical interface may display limited information related to the pedestrian, such as the pedestrian's current distance from autonomous vehicle 140 and current velocity. Although this disclosure describes providing a particular graphical interface in a particular manner, this disclosure contemplates providing any suitable graphical interface in any suitable manner.

Figure 4:
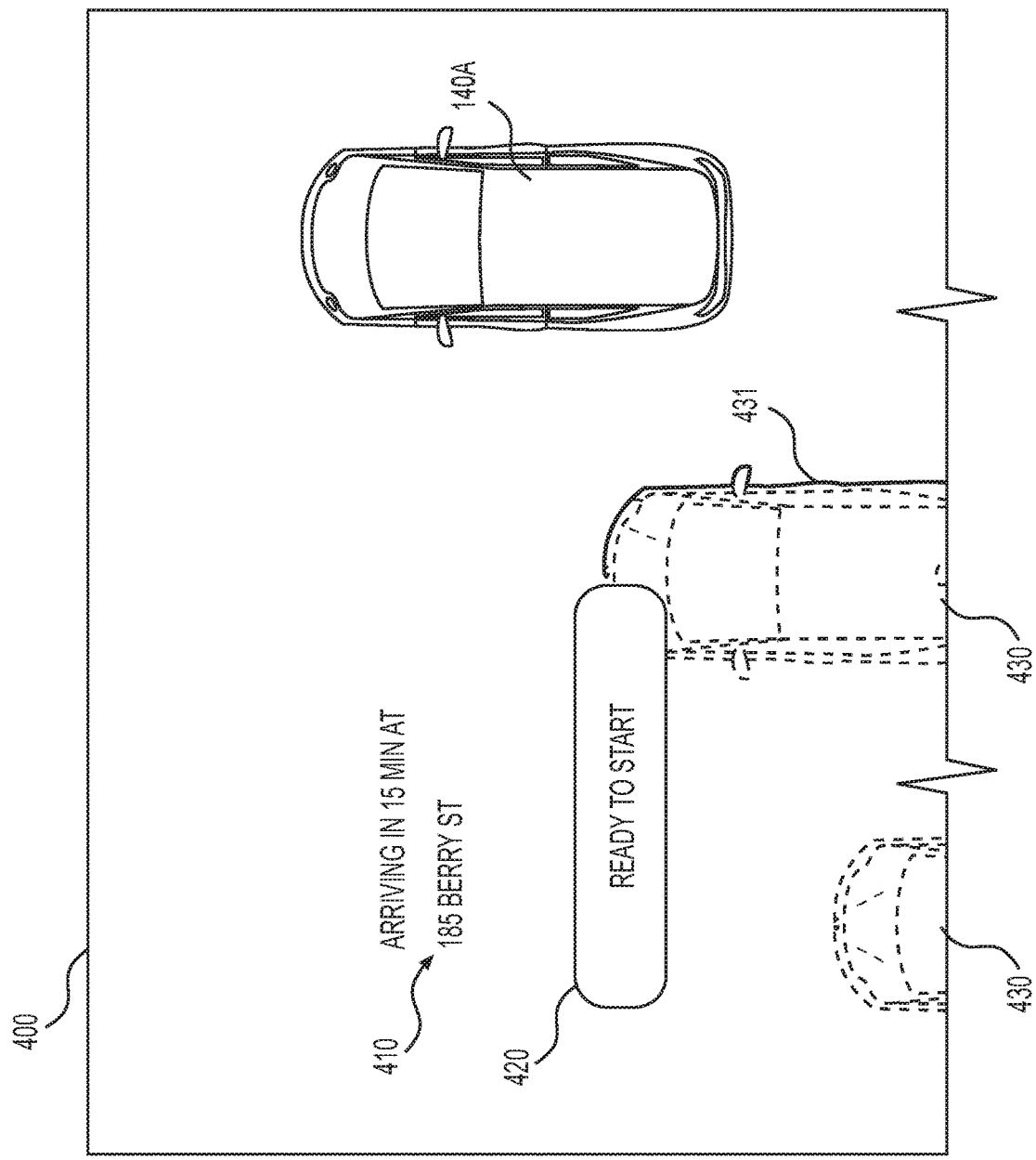
FIG. 4 illustrates an example UI for a beginning of a ride in an autonomous vehicle associated with a dynamic transportation matching system.

FIG. 4 illustrates an example UI for a beginning of a ride in an autonomous vehicle. UI 400 may be presented to the passenger upon entrance into the autonomous vehicle 140. UI 400 may be displayed on autonomous-vehicle UI device 148, user device 130, or any other suitable display. UI 400 may provide instructions and information 410 regarding the ride, destination, rider, vehicle, or any other suitable information. UI 400 may include interactive element 420 to allow the passenger to begin the ride. UI 400 may also include a reference vehicle 140A that represents the autonomous vehicle 140 that the passenger is sitting in.

UI 400 may also include object graphics 430. The object graphics 430 may represent physical objects that are within a threshold distance of autonomous vehicle 140. As an example and not by way of limitation, object graphics 430 may represent cars driving along the same road as autonomous vehicle 140. Object graphics 430 may be displayed in the graphical interface 400 to help the passengers understand that the autonomous vehicle 140 is aware of its surroundings. This may help a user feel more at ease knowing that the autonomous vehicle 140 knows of nearby objects. The object graphics 430 may additionally include near-edge indications 431. Near-edge indications may be a graphical indication that the autonomous vehicle 140 is aware of the nearest edges of the identified objects. For example, the near-edge indications 431 may be rendered as emboldened lines that represent the near edges of the object. Near-edge indications may be rendered and displayed in any suitable situational-awareness view and not just in the context of FIG. 4. The object classification, size, and shape may be inferred based on sensor data while the near-edge indications may correlate to the sensor data received from the sensor array 144. Rendering objects with near-edge indications may further assuage a user's anxiety over riding in an autonomous vehicle because near-edge indications may help the user understand that the autonomous vehicle is aware of the closest edges of nearby objects.

Figure 5:
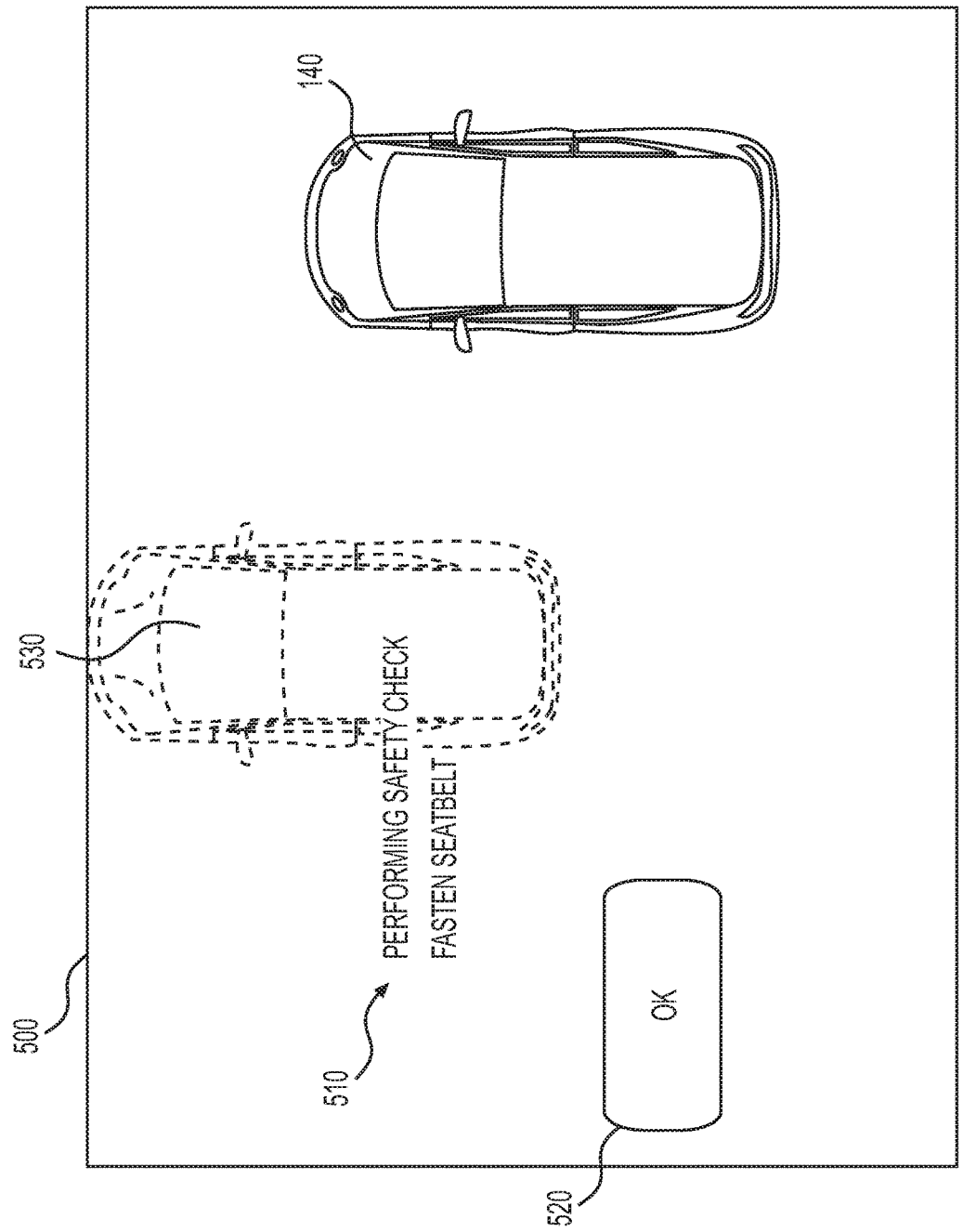
FIG. 5 illustrates another example UI for a beginning of a ride in an autonomous vehicle associated with a dynamic transportation matching system.

FIG. 5 illustrates another example UI for a beginning of a ride in an autonomous vehicle associated with a dynamic transportation matching system. UI 500 shows further instructions and information 510 such as a direction to fasten a seatbelt. Additionally, UI 500 may include feedback to the user regarding where they may find their seatbelt. Object graphics 530 may indicate to the user that autonomous vehicle 140 is aware of nearby objects. Once the user has fastened their seatbelt, they may tap interactive element 520 to begin the ride. Alternatively, the autonomous vehicle 140 may automatically detect a seatbelt fastening and may begin the ride without further input from the user.

Figure 6:
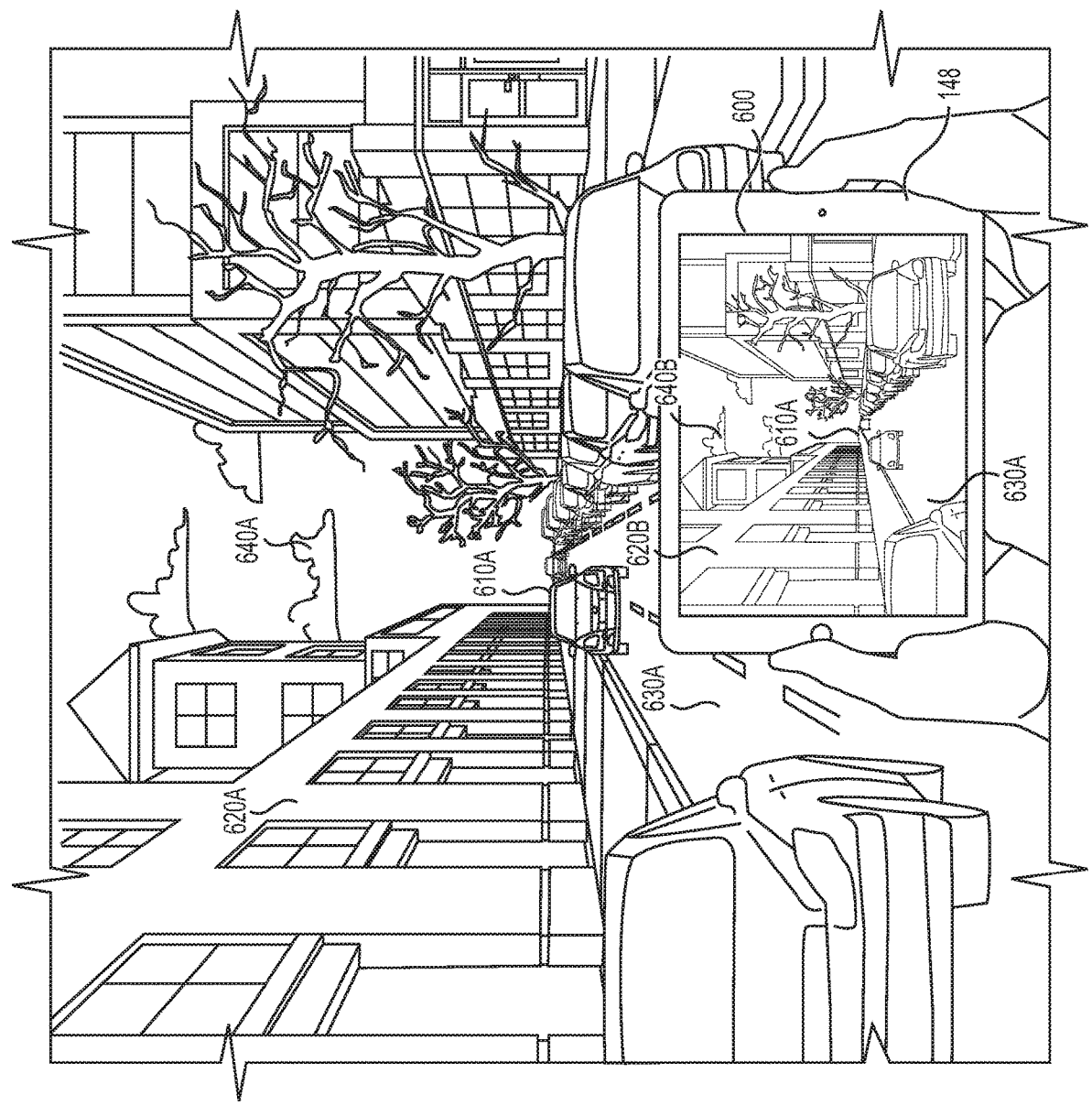
FIG. 6 illustrates an example UI on an example autonomous-vehicle UI device.

FIG. 6 illustrates an example UI on an example autonomous-vehicle UI device. Once a ride has begun, the user may handle the autonomous-vehicle UI device 148 by holding it and moving it in any direction the user desires. As discussed herein, the autonomous-vehicle UI device 148 may determine its orientation (e.g., North, South, East, West) as well as its tilt. This may allow the autonomous-vehicle UI device 148 to display a situational-awareness view 600 that corresponds to the external environment that is in front of the device 148. As an example and not by limitation, the external environment in front of the autonomous-vehicle UI device 148 may include road 630A, cars 610A, buildings 620A, and clouds 640A, as well as trees (not numbered) or any other suitable object. Corresponding road graphics 630B, object graphics (e.g., car 610B, building 620B, cloud 640B) may be displayed in a situational-awareness view on a display screen of autonomous-vehicle UI device 148. Note that in particular embodiments, cloud 640B may not directly correspond with cloud 640A. Rather, the computing device may access third party weather data and determine that the weather may be partly cloudy. In response, the computing device may provide instructions to render a partly cloudy sky in the situational-awareness view on autonomous-vehicle UI device 148. In particular embodiments, although it may be possible to render a high definition representation that closely matches the actual external environment, the situational-awareness view may not include all the details that exist in the actual external environment due to limitations in processing speed, granularity of sensor data, and/or design considerations. For example, the situational-awareness view may not display license plate numbers, leaves on trees, cracks in the sidewalk, some design features of cars or buildings, people's faces, and other such details in order to save processing resources for other tasks, because such details are not captured by the sensor data, and/or because the system is designed to show an abstraction of the environment instead of an exact replication of the environment depending on the specific features.

Figure 8:
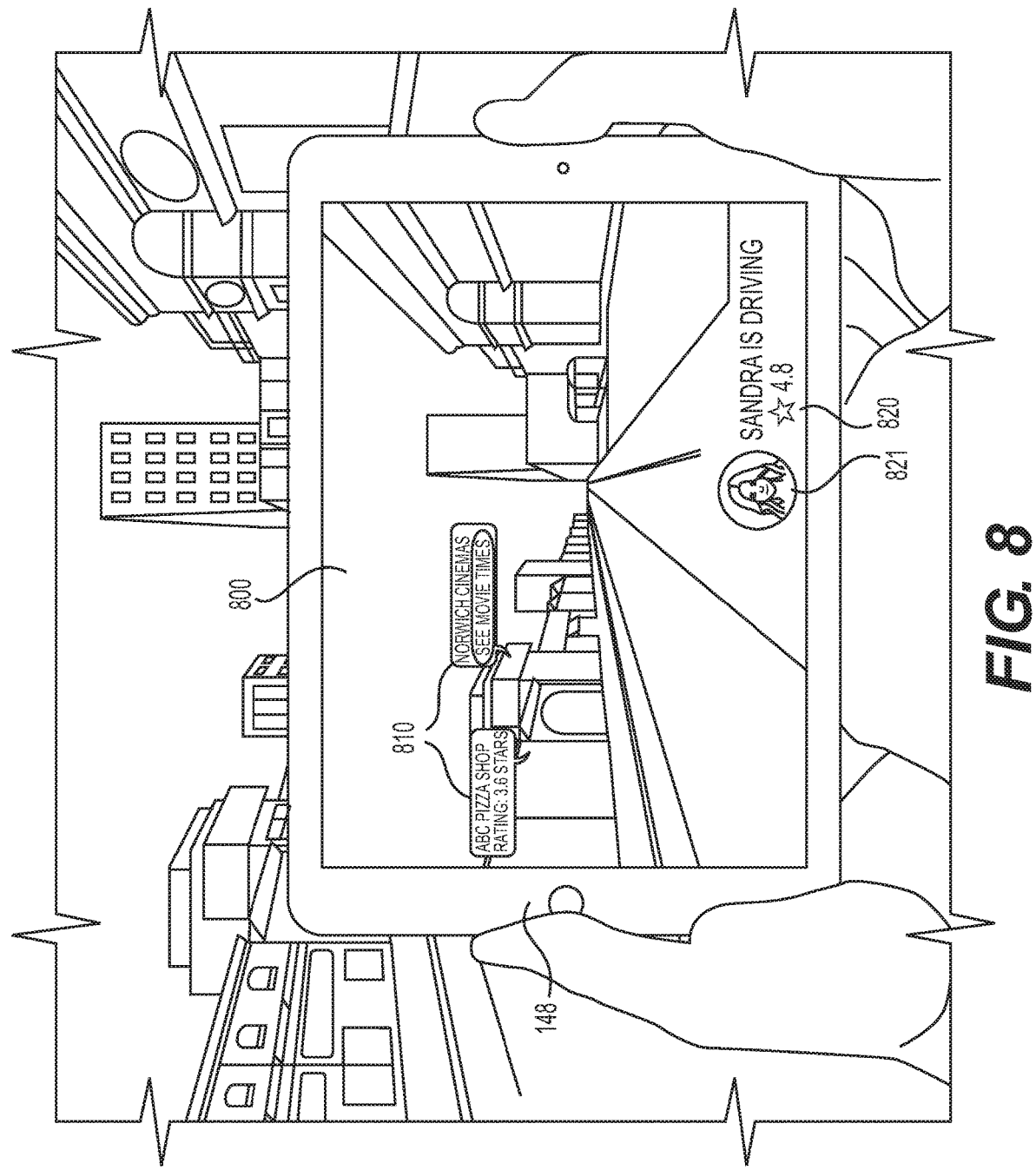
FIG. 8 illustrates another example UI on an example autonomous-vehicle UI device.

FIGS. 7 and 8 illustrate another example UI on an example autonomous-vehicle UI device. In particular embodiments, UI 700 and UI 800 may include an overlay graphic which may be an autonomous-drive indicator 720 and 820. Autonomous drive indicator 720 and 820 may indicate when autonomous vehicle 140 is operating in an autonomous-drive mode and when autonomous vehicle 140 is being operated by a human driver. In particular embodiments, autonomous vehicle 140 may have a "safety driver," which is a human who may or may not drive autonomous vehicle 140. The autonomous-drive indicator 720 and 820 may display certain information based on the state of autonomous vehicle 140. Autonomous vehicle 140 may have at least three states: (i) the safety driver is operating the vehicle (illustrated in FIG. 8); (ii) the vehicle is being self-driven (illustrated in FIG. 7); and (iii) the vehicle is being self-driven above a certain speed (not illustrated). In state (i), the autonomous drive indicator 820 may include the safety driver's face 821 as well as textual information stating, for example, "Sandra is driving" to indicate that the vehicle is being operated by a human. In state (ii), the safety driver's face may be replaced by a different icon 721 that indicates that the vehicle is being self-driven. The icon may be anything that would indicate self-driving, such as a green steering wheel, a green circle, text that says that say "Autonomous Driving Activated," or any other suitable indication. In state (iii), the autonomous drive indicator may include additional information such as the vehicle's speed and direction. These display icons may inform the user when the vehicle is being operated by a human and when it is being self-driven, so that the user may be aware of how autonomous vehicle 140 is being operated. UI 700 and UI 800 may include additional overlay graphics 710 and 810 that provide information about nearby business and attractions.

Figure 9B:
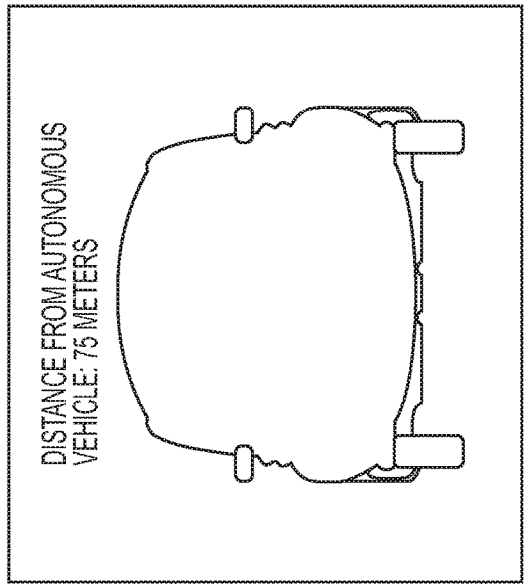
FIGS. 9A-9D illustrate an example detail-rendering progression as an object moves closer to the autonomous vehicle.
Figure 9D:
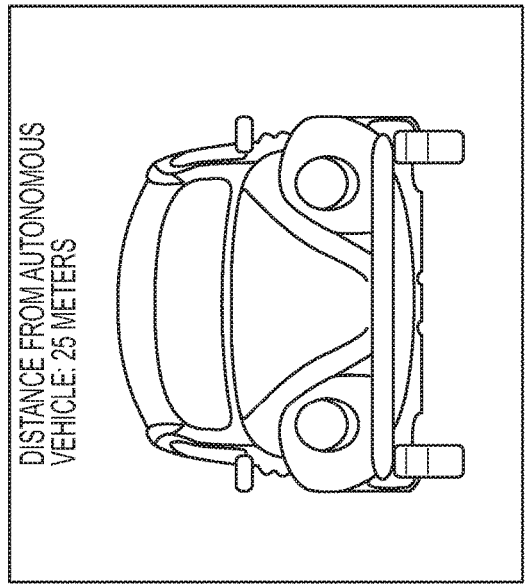
Figure 9A:
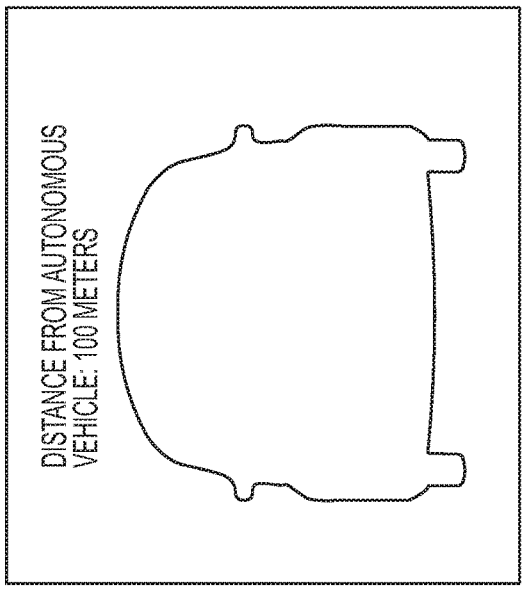
Figure 9C:
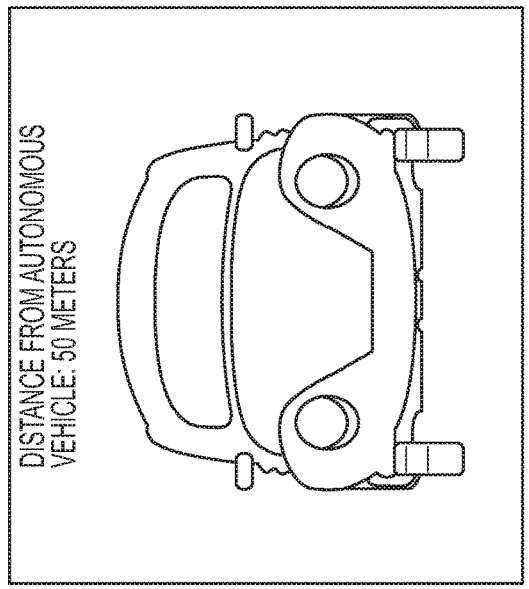

FIGS. 9A-9D illustrate an example detail-rendering progression as an object moves closer to the autonomous vehicle. In particular embodiments, objects that are farther away from autonomous vehicle 140 may be displayed in less detail than objects that are closer to autonomous vehicle 140. This may be to save processing resources for rendering objects in greater detail that are closer to the autonomous vehicle. The user is more likely to be interested in objects that are close to the vehicle, and thus the computing device may devote more resources to rendering object graphics in higher detail that correspond to objects that are close to the vehicle. Additionally, there may be insufficient sensor information to capture far away objects with the same level of detail as those objects that are closer to the autonomous vehicle. To illustrate this principle, FIG. 9A illustrates an example rendering of a detected and classified object that is 100 meters away from autonomous vehicle 140. FIG. 9B illustrates an example rendering of a detected and classified object that is 75 meters away from autonomous vehicle 140. FIG. 9C illustrates an example rendering of a detected and classified object that is 50 meters away from autonomous vehicle 140. FIG. 9D illustrates an example rendering of a detected and classified object that is 25 meters away from autonomous vehicle 140. As can be seen by FIGS. 9A-9D, as the vehicle moves closer to the autonomous vehicle, its corresponding object graphic is displayed in greater detail. Although the distances used here are specific distances, this disclosure contemplates any suitable distance to render the object graphic in greater detail. For example, the distance corresponding to FIG. 9A may be 100 feet, the distance corresponding to FIG. 9B may be 75 feet, and so on. Further, the distance intervals between detail levels need not be consistent. This disclosure contemplates any suitable distance for detected objects and any suitable level of detail for object graphics. In particular embodiments, the different levels of detail may be replaced with different levels of opacity. Thus, objects that are far away from autonomous vehicle 140 may be rendered with a lower level of opacity (e.g., a higher level of transparency). As objects move closer to the autonomous vehicle, they may be rendered with a higher level of opacity. In particular embodiments, the level of detail or level of opacity may depend on a confidence score of an object classification for a detected object instead of the distance between the detected object and the autonomous vehicle. This is discussed with reference to FIG. 12 below. Changing the opacity may be a way to let the user know that the autonomous vehicle 140 is aware of the objects and their proximity to the autonomous vehicle.

In particular embodiments, once the level of detail has been determined, the computing device (e.g., autonomous-vehicle UI device or other suitable computing device or combination thereof) may apply the level of detail by applying a particular surface treatment to the object graphic. The particular surface treatment may be selected by the computing device based on the determined level of detail, as discussed herein. The surface treatment may be any suitable surface treatment, including applying a point mesh to the object graphic. A point mesh may be a technique used to render the object graphic wherein only a particular number of points of the object graphic are rendered. As an example and not by way of limitation, the point mesh for a low level of detail may specify that every one in five points of the object graphic are to be rendered. As the level of detail increases, the number of points of the object graphic to be rendered also increases. Thus, a relatively high level of detail may correspond to an object graphic that has four out of every five points on the object graphic rendered. For the points that are not rendered, the computing device may provide instructions to make the unrendered points at least somewhat translucent.

In particular embodiments, the situational-awareness view may have 360° display capabilities. This may mean that a passenger (e.g., user 101 or another rider in autonomous vehicle 160) may handle autonomous-vehicle UI device 148 like a normal tablet and position it in any direction they desire. As the passenger moves autonomous-vehicle UI device 148 in different directions, the situational-awareness view may update to show a representation of the portion of the external environment that is directly in front of autonomous-vehicle UI device 148. As an example and not by way of limitation, if autonomous vehicle 140 is driving south along Pacific Coast Highway in Huntington Beach, Calif., the passenger may handle autonomous-vehicle UI device 148 and position it straight ahead. In this case, the situational awareness view may include a road graphic that represents Pacific Coast Highway, and one or more other object graphics that represent cars, pedestrians, or buildings. If the passenger points the autonomous-vehicle UI device 148 to their left, the situational awareness view may include several object graphics that represent buildings (e.g., Jill's Skimboard Shop on First Street, ABC Bagels), pedestrians, cars, or any other suitable objects. If the passenger points the autonomous-vehicle UI device 148 to their right, the situational-awareness view may include object graphics that represent objects that are located to the west of Pacific Coast Highway, such as a pier, a lifeguard house, a restaurant, and the Pacific Ocean.

The 360° capability may have the effect that the autonomous-vehicle UI device 148 has a camera that is capturing the external environment and rendering the situational-awareness view via the camera. In reality, sensor array 144 may be capturing the external environment and sending it to the autonomous-vehicle UI device 148 via a wired or wireless connection. The autonomous-vehicle UI device (or, in particular embodiments, the user's personal device) may determine its orientation by accessing real-time data generated by one or more internal sensors along with other data. Orientation may include both the direction the device is pointing (e.g., North, South, East, West) as well as the tilt of the device relative to the horizon (e.g., pointing down toward the ground, or up toward the sky). The direction the device is pointing may be determined by magnetic field sensors. Magnetic field sensors may determine the direction of Magnetic North. The device may combine the magnetic field data with GPS data to determine the direction of True North. The magnetic field sensors may return multi-dimensional arrays of sensor values. For example, the geomagnetic field sensor may provide geomagnetic field strength values for each of the three coordinate axes (e.g., (x, y, z) axes) at regular intervals. The three coordinate axes may remain fixed in relation to the device. Based on the geomagnetic field strength values for each coordinate axis, the device may determine which direction it is pointing. From the user's perspective, the x-axis may point to the right and left of the device, the y-axis may point up and down, and the z-axis may point out of and into the screen of the device. As an example and not by way of limitation, the geomagnetic field strength values may be measured at a given time as (0, 0, 1), which may mean that all of the magnetic force on the device is occurring in the positive Z direction. This may mean that the device is pointed due South with no tilt. As another example, the geomagnetic field strength values may be measured at a given time as (1, 0, 0), which may mean that all of the magnetic force on the device is occurring in the positive Y direction. This may mean that the device is pointed due West with no tilt.

The degree of tilt on the device may be determined from the magnetic field values alone, from gravity sensors, from the accelerometer, or from a combination of the three. Using magnetic field sensors, if the device is tilted downward slightly, there may be some magnetic force in the y-direction. As an example, if the device is oriented northward and also tilted downward, the geomagnetic field strength values may be measured as (0, 0.2, −0.8). The Z value may be negative because forces going into the screen may have negative Z values. The Y value may be 0.2 because there may be a magnetic force occurring in the positive Y direction, which may be toward the top of the computing device. As another example, if the device is oriented northward and also tilted upward, the geometric field strength values may be measured as (0, −0.2, −0.8). Additionally, the device may use gravity sensors to determine how much gravity force is occurring in each direction. As an example, if the device is pointed straight ahead in any of the X or Z directions, the gravity force may be entirely in the Y direction. Accelerometers may determine the angle at which the device is pointed (e.g., up at the sky, straight ahead, down toward the ground) as well as whether the device is oriented in landscape or portrait.

Once the orientation of the device is determined, a field of view may be determined that approximates what a user would expect to see on the display screen as they point the device in a given direction. The field of view may encompass parameters for the edges of the situational-awareness view. The field of view may be updated based on the orientation of the device. Based on the determined field of view, a corresponding situational-awareness view may be rendered for display on the display screen. To determine the corresponding situational-awareness view, the computing device may map the field of view parameters to a set of coordinate points associated with the autonomous-vehicle sensor data. The set of coordinate points may represent a particular area of the external environment and include data related to identified objects and identified roads. The computing device may provide instructions to render a situational-awareness view based on the set of coordinate points.

In particular embodiments, the situational-awareness view may be sent to a user device 130 of the user 101 or another passenger in autonomous vehicle 140. The functionality may be similar to that of the 360° view in autonomous-vehicle UI device 148, but may be displayed on a display screen of user device 130 instead.

Figure 10:
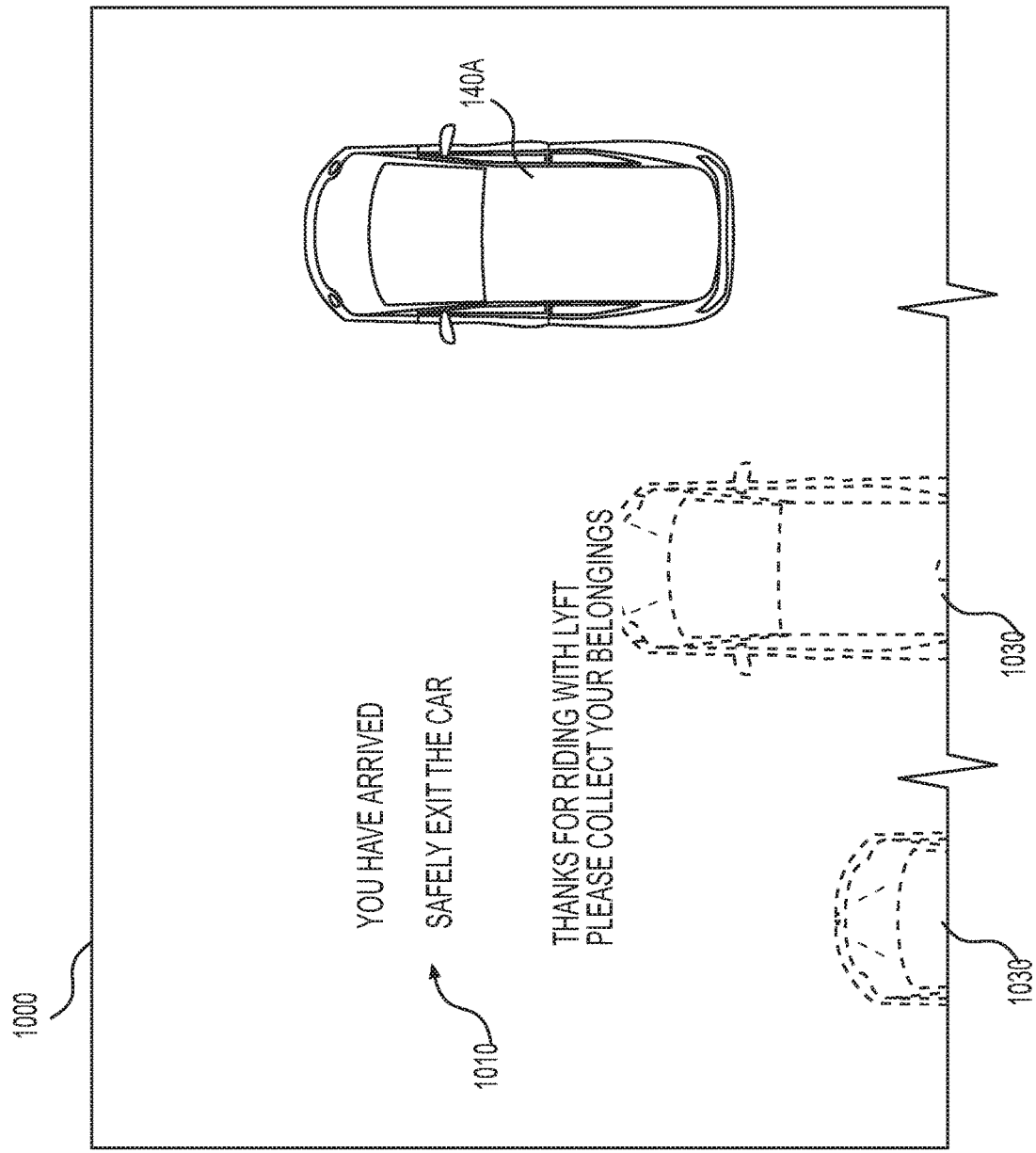
FIG. 10 illustrates an example UI for an end of a ride in an autonomous vehicle associated with a dynamic transportation matching system.

FIG. 10 illustrates an example graphical interface 1000 for presenting graphical representations of objects after an autonomous ride. When a ride ends, the autonomous-vehicle UI device 148 may display graphical user interface 1000. Graphical user interface 1000 may include information and instructions 1010, an object graphic 140A that corresponds to autonomous vehicle 140, as well as object graphics 1030 that correspond to detected objects in the external environment. The user may use object graphics 1030 for safety reasons. For example, the user may monitor the graphical interface to determine when it is safe to open a door to exit the vehicle.

In particular embodiments, after user 101 has completed a ride in autonomous vehicle 140 using rise-service system 160, dynamic transportation matching system 160 may provide a post-ride video of particular situational-awareness and other camera views that were generated during the ride. Dynamic transportation matching system 160 may send the post-ride video to user 101. User 101 may then share the post-ride video with friends via, e.g., social media. The post-ride video may include video and audio clips in addition to the situational-awareness views. Alternatively, the user 101 may have a preconfigured setting that authorizes dynamic transportation matching system 160 to post to an online social media page on their behalf. By sharing the video on social media, more people may become aware of dynamic transportation matching system 160 and the availability of autonomous rides using dynamic transportation matching system 160. This way potential users may familiarize themselves with dynamic transportation matching system 160 and autonomous vehicles before actually using the service.

Figure 11:
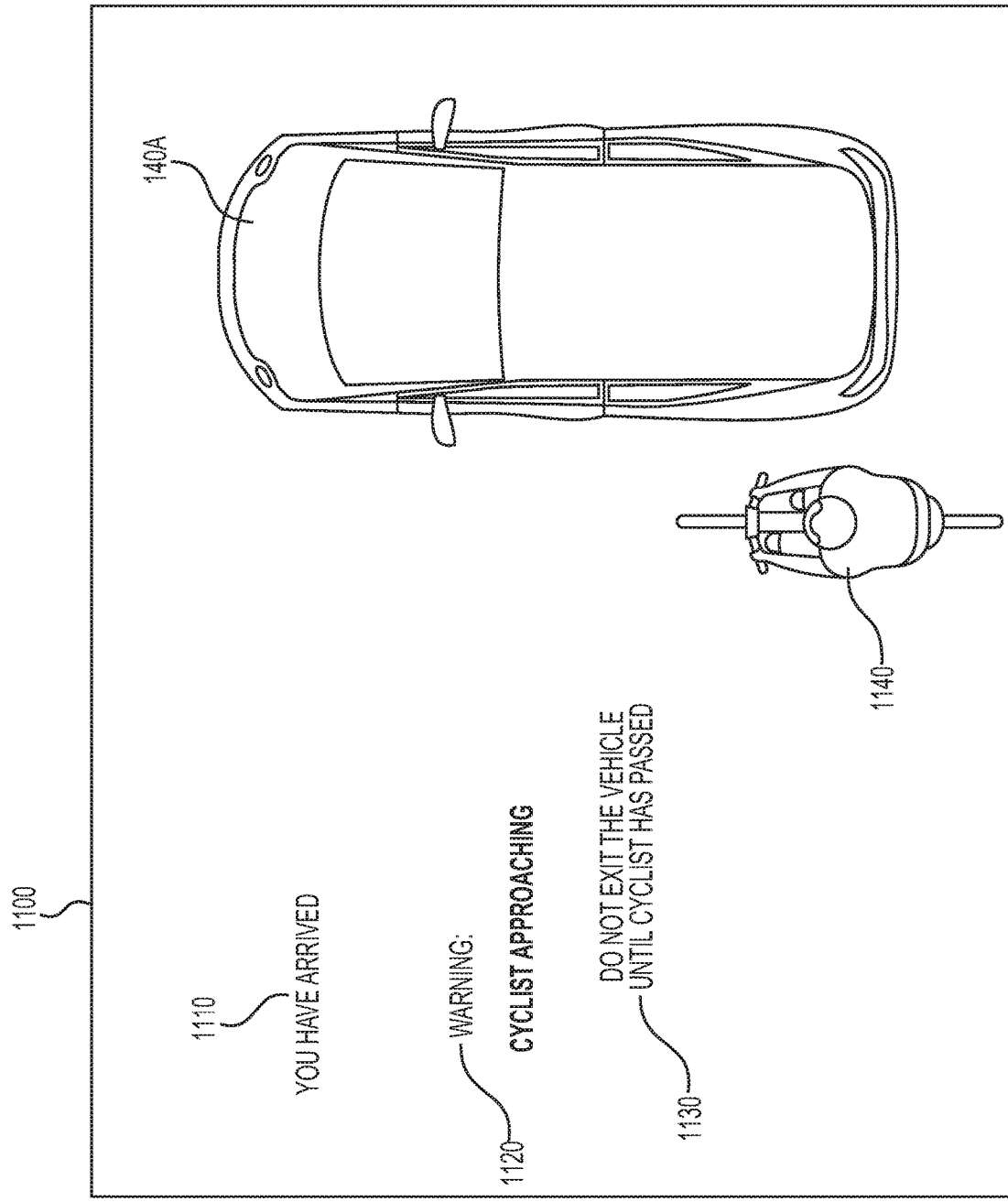
FIG. 11 illustrates an example graphical interface for presenting an example warning to a passenger at the end of an autonomous ride.

FIG. 11 illustrates an example graphical interface for presenting an example warning to a passenger at the end of an autonomous ride. In particular embodiments, the autonomous-vehicle UI device may present one or more alerts on the display screen that displays the situational-awareness view. The computing device may access autonomous-vehicle sensor data that contains an indication that an object is approaching an alert zone associated with autonomous vehicle 140. The computing device may make this determination by analyzing the autonomous-vehicle sensor data, determining a current path of the object (e.g., cyclist), and extrapolating the current path to estimate a near-term future path of the object. The near-term future path of the object may be a path that the computing device predicts the object to take in the immediate future, such as the next five or ten seconds. If the near-term future path of the object crosses an alert zone of the autonomous vehicle 140, the computing device may provide instructions to issue an alert. An alert zone may be an area immediately surrounding the autonomous vehicle within a threshold distance. The threshold distance may be the distance that a door swings open plus a buffer distance (e.g., two or three feet). If a cyclist is inside or will soon enter the alert zone, opening a door of the autonomous vehicle may result in a collision with the cyclist. In addition to informational text 1110, the autonomous-vehicle UI device may provide instructions to present a warning 1120 along with instructions 1130. As an example and not by way of limitation, the warning 1120 may state: "Warning: Cyclist Approaching." The instructions 1130 may state: "Do not exit the vehicle until the cyclist has passed."

Figure 12:
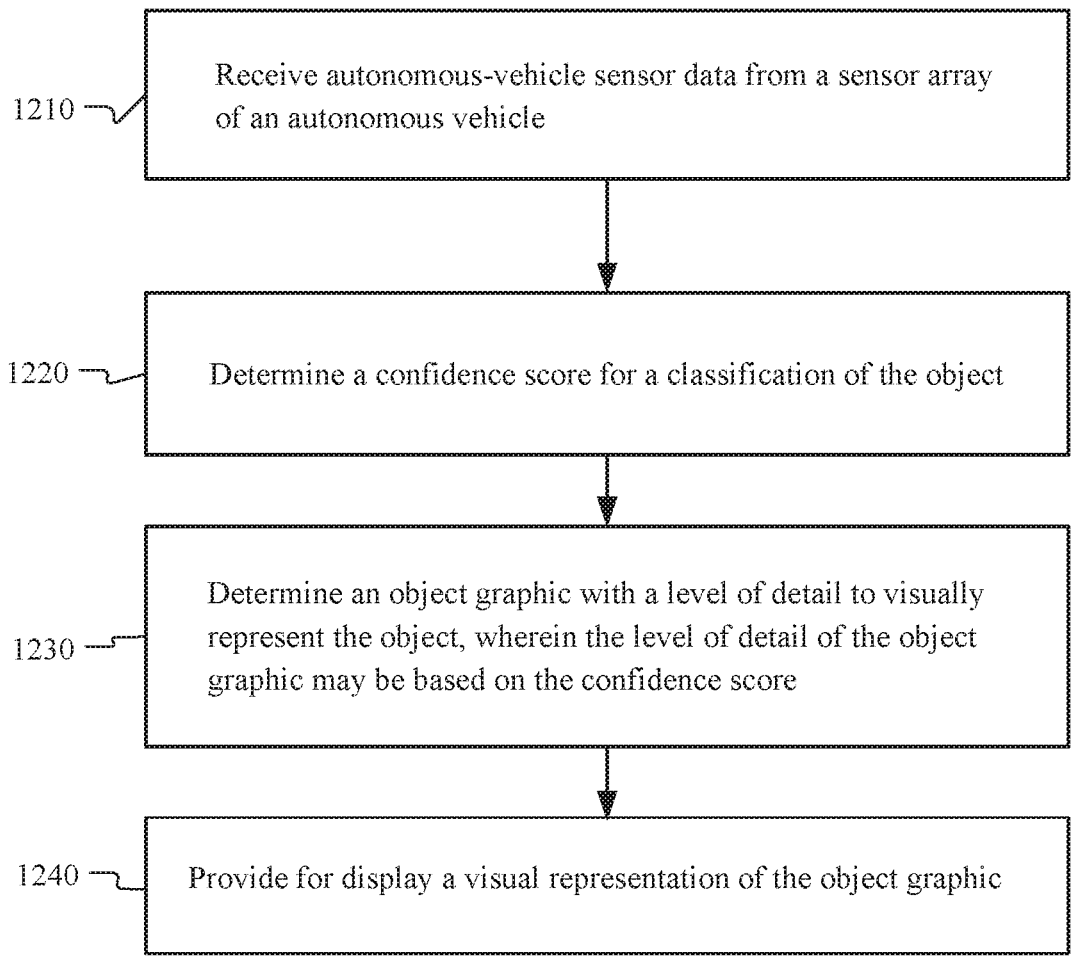
FIG. 12 illustrates an example method for providing a situational-awareness view for a ride in an autonomous vehicle associated with a dynamic transportation matching system.

FIG. 12 illustrates an example method 1200 for providing a situational-awareness view associated with an autonomous ride. The method may begin at step 1210, where a computing device associated with a dynamic transportation matching system (e.g., autonomous-vehicle UI device 148 or other suitable computing device) may receive autonomous-vehicle sensor data from a sensor array of an autonomous vehicle. The autonomous-vehicle sensor data may indicate an object in an external environment of the autonomous vehicle. At step 1220, the computing device may determine a confidence score for a classification of the object. At step 1230, the computing device may determine an object graphic with a level of detail to visually represent the object. The level of detail of the object graphic may be based on the confidence score. At step 1240, the computing device may provide for display a visual representation of the object graphic.

Figure 13:
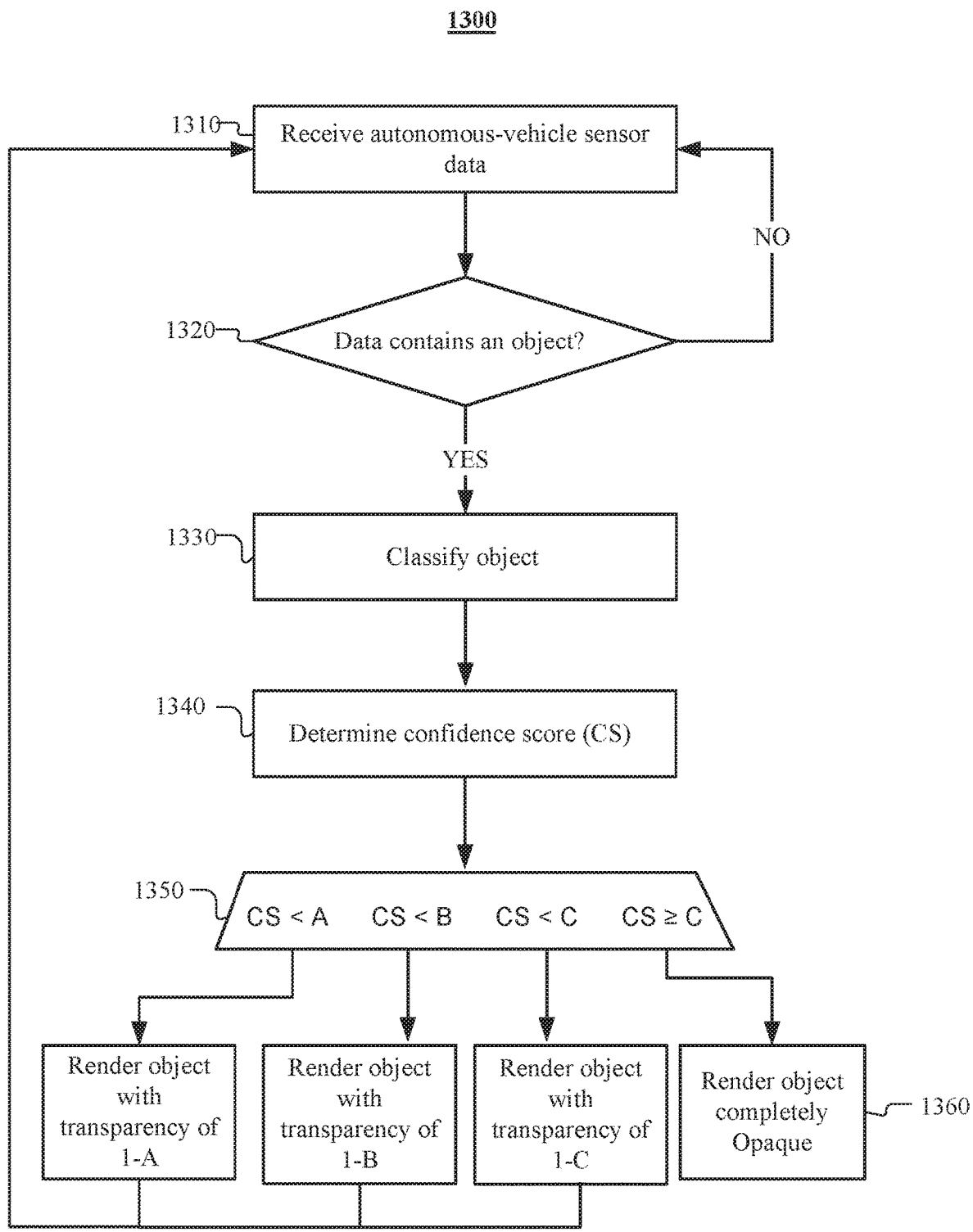
FIG. 13 illustrates an example method for determining an opacity or transparency for an object graphic.

FIG. 13 illustrates an example method 1300 for determining the opacity/transparency with which to render an object graphic. In particular embodiments, as the confidence score for a particular identified object increases, the corresponding object graphic may be rendered in greater detail. In particular embodiments, as the confidence score increases, the corresponding object graphic may be rendered with more opacity. At step 1310, the computing device may receive autonomous-vehicle sensor data. The data may be raw or may be organized into labeled point sets, as discussed previously. At step 1320, the computing device may determine whether the data contains an object. If it is determined that the data does not contain an object, the process may return to step 1310. If it is determined that the data contains an object, the process may proceed to step 1330, where the computing device may classify the object. At step 1340, the computing device may determine a confidence score for the classification, as discussed previously.

In particular embodiments, the data may be received as labeled point sets with confidence scores. The labeled point sets and corresponding confidence scores may be generated by another system such as sensor array 144 and sent to the computing device after they are generated. Sensor array 144 may be manufactured and maintained by a third-party entity 170. In this scenario, steps 1310 through 1340 may be skipped and the method may begin at step 1250, where the computing device may determine whether the confidence score for a given classified object falls into one of a plurality of windows. Although four windows are illustrated in FIG. 13 (e.g., CS<A, CS<B, CS<C, CS≥C, where CS is "confidence score" and A, B, and C are particular threshold confidence scores), any number of windows is contemplated by this disclosure. Depending on which window the confidence score falls into, at step 1360, the computing device may render the object graphic with a different level of transparency. In this example method, the transparency is inversely based on the confidence score. As the confidence score increases, the object graphic is rendered with less transparency. As an example and not by way of limitation, let A=0.25, B=0.50, and C=0.75. Thus, a classified object with a confidence score of 0.24 would be represented by an object graphic with a transparency of T=1−0.25=0.75. A classified object with a confidence score of 0.26 may fall into window B, so the transparency of the corresponding object graphic may be T=1−0.50=0.50.

Figure 14:
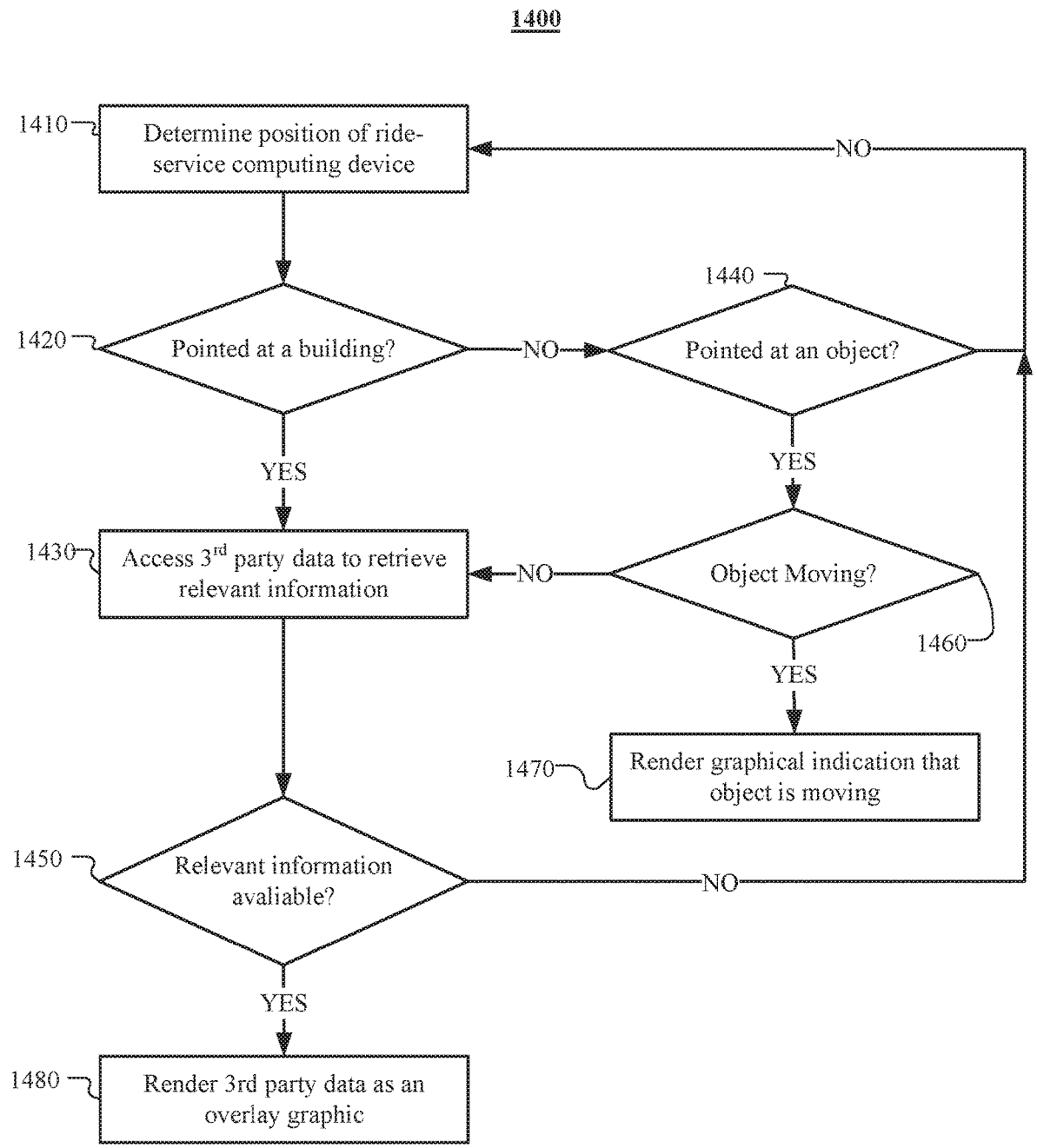
FIG. 14 illustrates an example method for determining an overlay graphic based on third-party data.

FIG. 14 illustrates an example method 1400 for determining an overlay graphic from third-party data. An overlay graphic may provide particular information associated with one or more aspects of autonomous vehicle 140, user 101, the ride user 101 is currently taking, object graphics, road graphics, a current route of autonomous vehicle 140, or any other suitable information. Examples of overlay graphics include route indicator 350, destination indicator interface element 360, and map toggle interface element 370. Other examples of overlay graphics that are not illustrated in FIG. 3 but nevertheless contemplated by this disclosure include information related to detected objects corresponding to object graphics, a music playlist of user 101, information related to detected roads corresponding to road graphics, or any other suitable information. As an example and not by way of limitation, the computing devices may incorporate information related to nearby businesses and attractions from third-party applications such as YELP, GOOGLE MAPS, or other map-based databases. At step 1410, the computing device may determine the orientation of the autonomous-vehicle UI device 148, or alternatively, the user device 130 if the situational-awareness view is being displayed there. In particular embodiments the computing device may be the autonomous-vehicle UI device 148 or may be another computing device associated with autonomous vehicle 140. At step 1420, the computing device may determine whether the autonomous-vehicle UI device 148 is pointed at a building. If yes, the process may proceed to step 1430. If no, the process may proceed to step 1440. At step 1430, the computing device may access third party data to retrieve information that is relevant to the building that the autonomous-vehicle UI device 148 is pointed towards. As an example and not by way of limitation, the computing device may access GOOGLE map data to determine the address, phone number, hours of operation, and any other suitable information. At step 1450, the computing device may determine if any relevant information is available. If yes, the computing device may proceed to step 1480 and send instructions to render the third-party data as an overlay graphic. As an example and not by way of limitation, YELP data may be displayed as an overlay graphic over an object graphic representing a particular restaurant. This data may include an average customer rating, hours of operation, an interactive option to book a table at the restaurant, or any other suitable information. If no relevant third-party information is available, the computing device may not render any overlay graphic, and may return to step 1410. Although this method discusses the steps with respect to an autonomous-vehicle UI device 148, this disclosure contemplates method 1300 being performed with respect to a user device 130, as discussed herein.

Returning to the decision at step 1420, if the autonomous-vehicle UI device is not pointed at a building, the computing device may determine if the autonomous-vehicle UI device is pointed at another object. If no, the process may return to step 1410. If yes, the process may determine if the object is moving. As an example and not by way of limitation, the object may be a pedestrian that is crossing the street in front of autonomous vehicle 140. If the object is moving, the computing device may proceed to step 1470 and send instructions to render a graphical indication that the object is moving. As an example and not by way of limitation, the graphical indication may be a bounding box 311 that surrounds the moving object graphic, or a diamond or star that appears to float above the object graphic. As another example and not by way of limitation, the graphical indication may be a change of color of the moving object graphic (e.g., from yellow to red). In particular embodiments, the color of the object graphic may be based on the velocity of the object the object graphic represents. As an example and not by way of limitation, object graphics corresponding to objects moving slower than 25 mph may be rendered as yellow, object graphics corresponding to objects moving between 26 and 50 mph may be rendered as orange, and object graphics corresponding to objects moving faster than 51 mph may be rendered as red. As another example and not by way of limitation, the color of object graphics may be related to the speed limit on the road upon which the objects are traveling. For example, if the speed limit on a particular road is 35 mph, object graphics corresponding to objects traveling less than 36 miles per hour may be rendered as green, and object graphics corresponding to objects traveling greater than 35 miles per hour may be rendered as red.

In particular embodiments, if the object is not moving, the computing device may proceed to step 1430 and attempt to access third party data relevant to the identified object. As an example and not by way of limitation, the object may be a mailbox and the third-party information may be mail pickup times. The process may proceed from step 1430 as discussed previously.

Particular embodiments may repeat one or more steps of the method of FIGS. 12-14, where appropriate. Although this disclosure describes and illustrates particular steps of the method of FIGS. 12-14 as occurring in a particular order, this disclosure contemplates any suitable steps of the method of FIGS. 12-14 occurring in any suitable order. Moreover, although this disclosure describes and illustrates an example method for determining an overlay graphic from third-party data including the particular steps of the method of FIGS. 12-14, this disclosure contemplates any suitable method for determining an overlay graphic from third-party data including any suitable steps, which may include all, some, or none of the steps of the method of FIGS. 12-14, where appropriate. Furthermore, although this disclosure describes and illustrates particular components, devices, or systems carrying out particular steps of the method of FIGS. 12-14, this disclosure contemplates any suitable combination of any suitable components, devices, or systems carrying out any suitable steps of the method of FIGS. 12-14.

Figure 15:
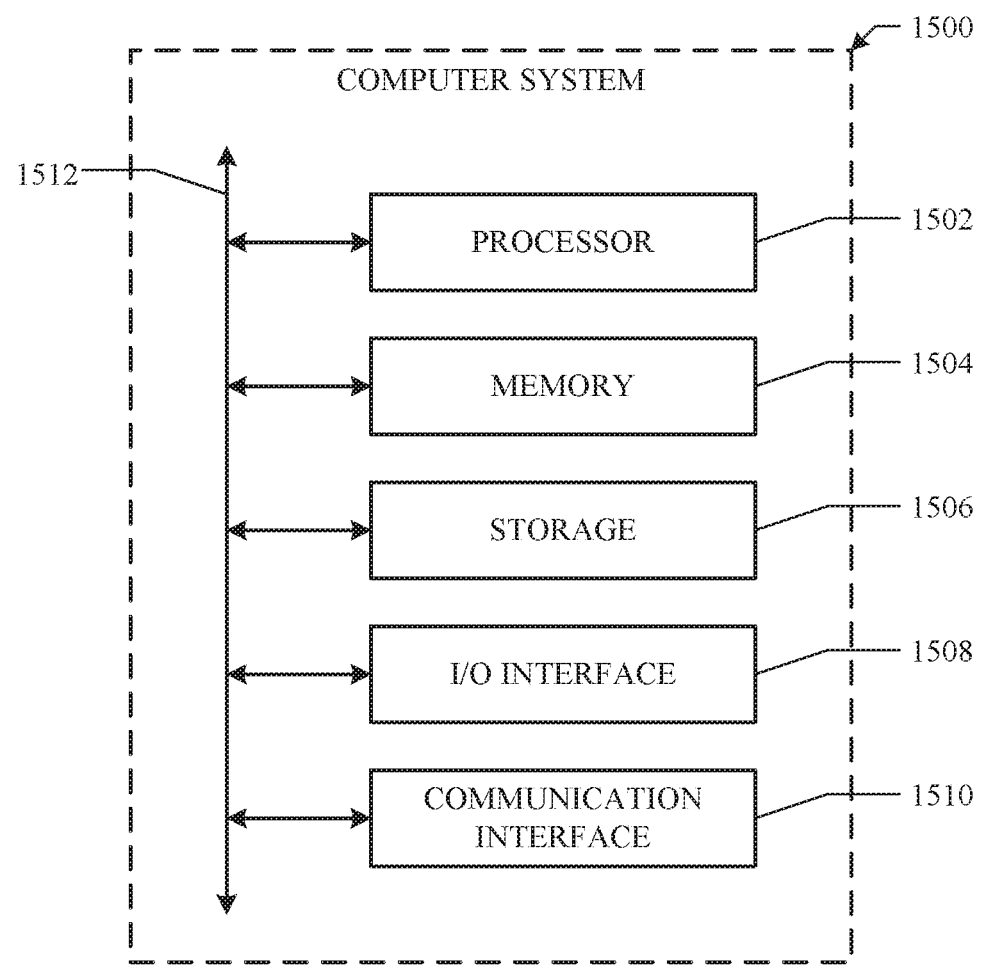
FIG. 15 illustrates an example computer system.

FIG. 15 illustrates an example computer system 1500. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described in further detail below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising, by one or more computing devices:
   receiving first sensor data from a sensor array of a vehicle while traveling on a road, wherein the first sensor data is associated with a distance between the vehicle and an object along the road in an environment external of the vehicle;
   determining a confidence score for a classification of the object based on the first sensor data associated with the distance between the object and the vehicle;
   determining a level of visual detail to visually represent the object as a first object graphic based on the determined confidence score for the classification of the object;
   providing for display a visual representation of the first object graphic rendered at the level of visual detail and a road graphic associated with the road;
   subsequent to providing for display the visual representation of the first object graphic and the road graphic, adjusting the confidence score for the classification of the object based on second sensor data, received from the sensor array of the vehicle, that is associated with a second distance between the object and the vehicle;

adjusting the level of visual detail to visually represent the object as a second object graphic based on the adjusted confidence score for the classification of the object; and providing for display a visual representation of the second object graphic rendered at the adjusted level of visual detail and the road graphic associated with the road.

2. The method of claim 1, wherein determining the confidence score for the classification of the object comprises:

comparing the received first sensor data with a pre-determined pattern that corresponds to the classification; and determining a difference between the pre-determined pattern and the received first sensor data.

3. The method of claim 1, wherein the first object graphic and the second object graphic share one or more features representative of the object.

4. The method of claim 3, wherein wherein the second object graphic has more features representative of the object than the first object graphic.

5. The method of claim 1, wherein the first sensor data or the second sensor data comprises a list of coordinate points corresponding to one or more objects within a threshold distance of the vehicle.

6. The method of claim 1, further comprising:

determining, based on the determined confidence score and the adjusted confidence score for the classification of the object, a first opacity for the first object graphic and a second opacity for the second object graphic, respectively.

7. The method of claim 1, wherein the first sensor data or the second sensor data comprises:

a labeled point set corresponding to each object represented by an object graphic; and a confidence score for the labeled point set.

8. The method of claim 1, wherein the adjusted confidence score is greater than the determined confidence score.

9. The method of claim 1, wherein the first sensor data or the second sensor data further indicates a plurality of additional objects in the environment external of the vehicle and is associated with a distance between the vehicle and each additional object of the plurality of additional objects, wherein the method further comprises:

determining, for each additional object of the plurality of additional objects, a level of visual detail to visually represent the additional object based on a determined distance between the object and the vehicle; and selecting an object graphic for each additional object of the plurality of additional objects, wherein a first additional object closer to the vehicle is represented by an object graphic that has a higher level of visual detail than an object graphic representing a second additional object farther from the vehicle.

10. The method of claim 1, further comprising:

based on the second sensor data, determining that the object is moving; and providing instructions to render the visual representation of the second object graphic with a graphical indication that the object is moving.

11. The method of claim 1, wherein at least some of the first sensor data or the second sensor data is generated by one or more sensors of the vehicle.

12. The method of claim 1, wherein the method further comprises:

determining, based on the first sensor data or the second sensor data, an overlay graphic that provides information associated with one or more of a state of the vehicle, a current ride of the vehicle, a current passenger of the vehicle, or a current route of the vehicle, wherein the visual representation provided for display further comprises the overlay graphic.

13. A system comprising: one or more processors and one or more computer-readable non-transitory storage media coupled to one or more of the processors, the one or more computer-readable non-transitory storage media comprising instructions operable when executed by the one or more processors to cause the system to perform operations comprising:

receiving first sensor data from a sensor array of a vehicle while traveling on a road, wherein the first sensor data is associated with a distance between the vehicle and an object along the road and in an environment external of the vehicle;

determining a confidence score for a classification of the object based on the first sensor data associated with the distance between the object and the vehicle;

determining a level of visual detail to visually represent the object as a first object graphic based on the determined confidence score for the classification of the object;

providing for display a visual representation of the first object graphic rendered at the level of visual detail and a road graphic associated with the road;

subsequent to providing for display the visual representation of the first object graphic and the road graphic, adjusting the confidence score for the classification of the object based on second sensor data, received from the sensor array of the vehicle, that is associated with a second distance between the object and the vehicle;

adjusting the level of visual detail to visually represent the object as a second object graphic based on the adjusted confidence score for the classification of the object; and providing for display a visual representation of the second object graphic rendered at the adjusted level of visual detail and the road graphic associated with the road.

14. The system of claim 13, wherein determining the confidence score for the classification of the object comprises:

comparing the received first sensor data with a pre-determined pattern that corresponds to the classification; and determining a difference between the pre-determined pattern and the received first sensor data.

15. One or more computer-readable non-transitory storage media including instructions that, when executed by one or more processors, are configured to cause the one or more processors to perform operations comprising:

receiving first sensor data from a sensor array of a vehicle while traveling on a road, wherein the first sensor data is associated with a distance between the vehicle and an object along the road in an environment external of the vehicle;

determining a confidence score for a classification of the object based on the first sensor data associated with the distance between the object and the vehicle;

determining a level of visual detail to visually represent the object as a first object graphic based on the determined confidence score for the classification of the object;

providing for display a visual representation of the first object graphic rendered at the level of visual detail and a road graphic associated with the road;

subsequent to providing for display the visual representation of the first object graphic and the road graphic, adjusting the confidence score for the classification of the object based on second sensor data, received from the sensor array of the vehicle, that is associated with a second distance between the object and the vehicle;

adjusting the level of visual detail to visually represent the object as a second object graphic based on the adjusted confidence score for the classification of the object; and providing for display a visual representation of the second object graphic rendered at the adjusted level of visual detail and the road graphic associated with the road.

16. The computer-readable non-transitory storage media of claim 15, wherein determining the confidence score for the classification of the object comprises:

comparing the received first sensor data with a pre-determined pattern that corresponds to the classification; and determining a difference between the pre-determined pattern and the received first sensor data.

17. The method of claim 1, wherein the level of visual detail to visually represent the object as a first object graphic is associated with a plurality of levels of visual detail, each level of visual detail being associated with a threshold score; and wherein determining the level of visual detail to visually represent the object as a first object graphic based on the determined confidence score for the classification of the object comprises:

determining that the confidence score for the classification satisfies a particular threshold score; and identifying the level of visual detail associated with the particular threshold score.

18. The method of claim 1, wherein adjusting the level of visual detail to visually represent the object as a second object graphic based on the adjusted confidence score for the classification of the object comprises:

increasing the level of visual detail to visually represent the object based on determining that the adjusted confidence score for the classification of the object is greater than the determined confidence score for the classification of the object.

19. The method of claim 1, wherein the first object graphic and the second object graphic are computer-generated graphical representations of the object.

20. The method of claim 1, further comprising:

determining, based on the first sensor data, movement of the object relative to the vehicle, wherein determining the level of visual detail to visually represent the object as the first object graphic is further based on the determined movement of the object relative to the vehicle while the vehicle is traveling on the road.

* * * * *